(12) United States Patent
Koorapaty et al.

(10) Patent No.: US 8,811,331 B2
(45) Date of Patent: Aug. 19, 2014

(54) PILOT DESIGN USING COSTAS ARRAYS

(75) Inventors: Havish Koorapaty, Cary, NC (US);
Jiann-Ching Guey, Cary, NC (US);
Kumar Balachandran, Cary, NC (US);
Rajaram Ramesh, Raleigh, NC (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 511 days.

(21) Appl. No.: 12/420,404

(22) Filed: Apr. 8, 2009

(65) Prior Publication Data

US 2009/0285173 A1    Nov. 19, 2009

Related U.S. Application Data

(60) Provisional application No. 61/043,980, filed on Apr. 10, 2008.

(51) Int. Cl.
*H04L 5/22* (2006.01)
*H04L 5/00* (2006.01)
*H04W 72/04* (2009.01)

(52) U.S. Cl.
CPC ............. *H04L 5/0048* (2013.01); *H04L 5/005* (2013.01); *H04L 5/0051* (2013.01); *H04W 72/0446* (2013.01)
USPC ............................ 370/330; 370/491; 370/500

(58) Field of Classification Search
None
See application file for complete search history.

(56) References Cited

U.S. PATENT DOCUMENTS

| | | | |
|---|---|---|---|
| 6,047,171 A | 4/2000 | Khayrallah et al. | |
| 6,088,416 A | 7/2000 | Perahia et al. | |
| 6,320,843 B1 | 11/2001 | Rydbeck et al. | |
| 6,332,006 B1 | 12/2001 | Rydbeck et al. | |
| 6,407,699 B1 | 6/2002 | Yang | |

(Continued)

FOREIGN PATENT DOCUMENTS

| | | |
|---|---|---|
| EP | 1 489 808 A2 | 12/2004 |
| JP | 2003-69526 A | 3/2003 |
| WO | 03/061170 | 7/2003 |
| WO | 2007/064286 A | 6/2007 |

OTHER PUBLICATIONS

Philips, "Performance of LTE DL MU-MIMO with Dedicated Pilots", 3GPP Draft, R1-071403, 3'° Generation (Partnership Project (3GPP), Mobile Competence Centre, vol. RAN WG1, no. St. Julian Mar. 26, 2007, Mar. 22, J2007.*

(Continued)

*Primary Examiner* — Kibrom T Hailu
*Assistant Examiner* — James P Duffy
(74) *Attorney, Agent, or Firm* — Nixon & Vanderhye, P.C.

(57) ABSTRACT

A multi-pilot frame handler (36) of a radio access network node (28) is arranged to prepare a block of a frame of information to include a first pilot signal of a pilot signal first type and a first pilot signal of a pilot signal second type. The pilot signal of the pilot signal first type is expressed as a first Costas array base pattern of resource elements of the block; the pilot signal of the second type is expressed as a second Costas array base pattern of resource elements of the block. The multi-pilot frame handler (36) is arranged to prepare the block so that any pilot signal of the pilot signal first type is carried by at least some subcarriers of a first set of subcarriers of the block and any pilot signal of the pilot signal second type is carried by at least some subcarriers of a second set of subcarriers of the block.

40 Claims, 9 Drawing Sheets

(56) References Cited

U.S. PATENT DOCUMENTS

| | | | |
|---|---|---|---|
| 6,480,556 B1 | 11/2002 | Guey | |
| 6,594,793 B1 | 7/2003 | Guey | |
| 6,671,309 B1 | 12/2003 | Craig et al. | |
| 6,754,253 B2 | 6/2004 | Guey | |
| 6,842,487 B1 | 1/2005 | Larsson | |
| 6,876,645 B1 | 4/2005 | Guey et al. | |
| 6,954,481 B1 | 10/2005 | Laroia et al. | |
| 6,961,364 B1 | 11/2005 | Laroia et al. | |
| 6,990,153 B1 | 1/2006 | Farhang-Boroujeni et al. | |
| 7,248,559 B2 | 7/2007 | Ma et al. | |
| 7,292,651 B2 | 11/2007 | Li | |
| 7,369,531 B2 | 5/2008 | Cho et al. | |
| 7,433,419 B2 | 10/2008 | Yun et al. | |
| 7,630,463 B2 | 12/2009 | Shin et al. | |
| 7,711,029 B2 | 5/2010 | Guey | |
| 8,295,311 B2 | 10/2012 | Guey | |
| 2001/0033606 A1 | 10/2001 | Akopian et al. | |
| 2002/0106008 A1 | 8/2002 | Guey | |
| 2003/0147480 A1 | 8/2003 | Richards et al. | |
| 2003/0231714 A1 | 12/2003 | Kjeldsen et al. | |
| 2004/0071110 A1 | 4/2004 | Guey et al. | |
| 2004/0095902 A1 | 5/2004 | Laroia et al. | |
| 2004/0257979 A1* | 12/2004 | Ro et al. | 370/208 |
| 2005/0088960 A1* | 4/2005 | Suh et al. | 370/208 |
| 2005/0099939 A1* | 5/2005 | Huh et al. | 370/210 |
| 2005/0147024 A1 | 7/2005 | Jung et al. | |
| 2005/0226141 A1 | 10/2005 | Ro et al. | |
| 2005/0238083 A1 | 10/2005 | Laroia et al. | |
| 2005/0249181 A1 | 11/2005 | Vijayan et al. | |
| 2006/0039318 A1 | 2/2006 | Oh et al. | |
| 2006/0045001 A1 | 3/2006 | Jalali | |
| 2006/0120272 A1* | 6/2006 | Wang et al. | 370/208 |
| 2007/0036179 A1 | 2/2007 | Palanki et al. | |
| 2007/0053282 A1 | 3/2007 | Tong et al. | |
| 2007/0127553 A1 | 6/2007 | Miller et al. | |
| 2007/0133462 A1* | 6/2007 | Guey | 370/330 |
| 2007/0153930 A1 | 7/2007 | Reid | |
| 2007/0189404 A1 | 8/2007 | Baum et al. | |
| 2008/0170602 A1 | 7/2008 | Guey | |
| 2008/0170608 A1 | 7/2008 | Guey | |
| 2008/0232504 A1* | 9/2008 | Ma et al. | 375/267 |
| 2008/0310484 A1 | 12/2008 | Shattil | |
| 2009/0285173 A1 | 11/2009 | Koorapaty et al. | |
| 2010/0238787 A1 | 9/2010 | Guey | |

OTHER PUBLICATIONS

International Search Report and Written Opinion mailed Aug. 13, 2009 in corresponding PCT application No. PCT/SE2009/050372.
Guey et al, "Synchronization Signal Design for OFDM Based on Time-Frequency Hopping Patterns", IEEE International Conference on Communications, 2007, Jun. 1, 2007, pp. 4329-4334.
Philips, "Performance of LTE DL MU-MIMO with Dedicated Pilots", 3GPP Draft, R1-071403, $3^{rd}$ Generation Partnership Project (3GPP), Mobile Competence Centre, vol. RAN WG1, no. St. Julian Mar. 26, 2007, Mar. 22, 2007.
McNair et al, "OFDM for High Data Rate, High-Mobility, Wide-Area Wireless Communications", Proc. IEEE Sarnoff Symposium, Princeton, NJ, Mar. 2001.
Chang et al, "Transmitter Architecture for Pulsed OFDM" *Proceedings, IEEE Asia Pacific Conference on Circuits and Systems*, pp. 693-696, 2004.
Uysal, et al, "A Space-Time Block-Coded OFDM Scheme for Unknown Frequency-Selective Fading Channels" *IEEE PIMRC'01*, San Diego, USA, Oct. 2001.
Costas, "A Study of a Class of Detection Waveforms Having Nearly Ideal Range-Doppler Ambiguity Properties", Proceedings of the IEEE, vol. 72, No. 8, Aug. 1964, pp. 996-1009.
Golomb et al, "Constructions and Properties of Costas Arrays", Proceedings of the IEEE, vol. 72, No. 9, Sep. 1964, pp. 1143-1163.
Klein et al, "Multiple Access OFDM for High Bit Rate Indoor Wireless Systems", Dept. of EECS, University of California Berkeley, Jun. 1999.
Tech. Spec., 3GPP TR 25.892, V2.0.0, $3^{rd}$ Generation Partnership Project; Technical Specification Group Radio Access Network; Feasibility Study for OFDM for UTRAN Enhancement; (Release 6), Jun. 2004.
Janjua et al, "Implementation of OFDM Transmitter Based on the IEEE 802.16d Standard", Dec. 2, 2004.
Guey, et al, "Classical Channel Estimation for OFDM Based on Delay-Doppler Response," The $18^{th}$ Annual IEEE International Symposium on Persona, Indoor and Mobile Radio Communications (PIMRC'07) 2007.
U.S. Office Action mailed Aug. 13, 2009 in corresponding U.S. Appl. No. 11/292,415.
International Search Report and Written Opinion mailed Jul. 8, 2008 in PCT application PCT/SE2007/051027.
Chang et al, "Frequency Coded Waveforms for Enhanced Delay-Doppler Resolution", IEEE Transactions on Information Theory, vol. 49, No. 11, 2003, pp. 2960-2971.
Hahm et al, "Inverse Filtering in the Presence of Doppler with Application to Specular Multipath Parameter Estimation", 1995 International Conference on Acoustics, Speech, and Signal Processing, 1995, vol. 5, pp. 3167-3170.
J. P. Costas, Abstract of "Medium Constraints on Sonar Design and Performance", in EASCON Abstracts, 1975, p. 973.
Benedetto et al, "International Conference on Concatenating Codes for Improved Ambiguity Behavior", Electromagnetics in Advanced Applications, 2007, pp. 464-467.
Popovic et al, "User Traffic Multiplexing on OFDM Downlink", Spread Spectrum Techniques and Applications, 2004, IEEE Eighth Int'l. Symposium, Aug. 30-Sep. 2, 2004, pp. 429-433.
International Search Report and Written Opinion mailed May 16, 2007 in corresponding PCT appin. PCT/SE2006/050455.
U.S. Office Action mailed Sep. 26, 2008 in corresponding U.S. Appl. No. 11/292,415.
Riga, "CDD-Based Precoding for E-UTRA Downlink MIMO", R1-063345, 3GPP TSG RAN WGl Meeting #47, Nov. 6-10, 2006.
Bauch et al, "Parameter Optimization, Interleaving and Multiple Access in OFDM with Cyclic Delay Diversity", 0-7803-8255-2/04, 2004, IEEEE, pp. 505-509.
Lodhi et al, "Performance Comparison of Space-Time Block Coded and Cyclic Delay Diversity MC-CDMA Systems", IEEE Wireless Communication, Apr. 2005, pp. 38-45.
U.S. Office Action mailed Feb. 5, 2009 in related U.S. Appl. No. 11/292,415.
U.S. Office Action mailed Feb. 16, 2011 in related U.S. Appl. No. 11/760,659.
U.S. Office Action mailed Feb. 17, 2011 in related U.S. Appl. No. 11/760,654.
Final Office Action mailed Aug. 8, 2011 in U.S. Appl. No. 11/760,659.
Final Office Action mailed Aug. 3, 2011 in U.S. Appl. No. 11/760,654.
Popovic, "Spreading Sequences for Multi-Carrier CDMA Systems," IEE Colloquium on CDMA Techniques and Applications for Third Generation Mobile Systems, May 19, 1997.
TSG-RAN WG1 #44bis, "E-UTR4 Random Access Preamble Design," R1-060998, Athens, Greece, Mar. 27-31, 2006.
Proakis, "Digital Communications 2nd edition." McGraw-Hill, 1989, pp. 834-835.
International Search Report mailed Nov. 7, 2008 in corresponding PCT application PCT/SE2007/051054.
Raghavendra et al, Exploiting Hopping Pilots for Parametric Channel Estimation in OFDM Systems, Signal Processing Letters, IEEE, vol. 12, No. 11, Nov. 2005, pp. 737-740.
English translation of Japanese Office Action mailed Jun. 26, 2012 in Japanese Application No. JP 2010-511141.
Guey, "The Design and Detection of Signature Sequences for Slot-Aligned System in Time-Frequency Selective Channel", Sep. 13, 2006.
Guey, "Optimal Detection of Time-Frequency Hopping Patterns in OFDM", Nov. 3, 2005.
Guey, "Pilot Pattern Design for OFDM", May 10, 2005.

(56) References Cited

OTHER PUBLICATIONS

IEEE Standard 802.16e-2005 and IEEE Standard 802.16-2004/Cor1-2005 (Ammendment and Corrigendum to IEEE Standard 802.16-2004); Air Interface for Fixed and Mobile Broadband Wireless Access Systems, Amendment 2: Physical and um Access Control Layers for Combined Fixed and Mobile Operation in License Bands, Feb. 28, 2006.

IEEE 802.16m System Description Document [Draft], IEEE 802.16m-08/003r7, Feb. 7, 2009.

International Preliminary Report on Patentability mailed Oct. 12, 2010 in PCT Application No. PCT/SE2009/050372.

U.S. Office Action mailed Jul. 26, 2011 in U.S. Appl. No. 12/438,623.

International Search Report for PCT/US2006/035128, mailed May 7, 2007.

Jung, Y-H et al., "Use of Periodic Pilot Tones for Identifying Base Stations of FH-OFDMA Systems", IEEE Communications Letters, vol. 10, No. 3, (Mar. 2006), pp. 192-194.

Van De Beek, J-J et al., "ML Estimation of Time and Frequency Offset in OFDM Systems", IEEE Transactions on Signal Processing, vol. 45, No. 7, (Jul. 1997), pp. 1800, col. 2-1802, col. 2-1804, col. 2.

Garcia, F-G. et al., "Tracking of Time-Frequency Misalignments in 2D-pilot-symbol-aided coherent OFDM systems", Vehicular Technology Conference, 2000, vol. 4, (Sep. 24, 2000), pp. 1704-1709.

English translation of Chinese Office Action mailed Feb. 11, 2011 in Chinese Application 200680055783.7.

\* cited by examiner

PILOT DESIGN USING COSTAS ARRAYS

This application claims the priority and benefit of U.S. provisional patent application 61/043,980, filed Apr. 10, 2008, entitled "Pilot Design Using Costas Arrays", which is incorporated herein by reference in its entirety.

BACKGROUND

This invention pertains to communications systems, and particularly to communication system which employ a pilot pattern for functions such as synchronization, channel estimation, fine time of arrival estimation and/or device identification.

In a typical cellular radio system, wireless terminals (also known as mobile terminals, mobile stations, and mobile user equipment units (UEs)) communicate via base stations of a radio access network (RAN) to one or more core networks. The wireless terminals (WT) can be mobile stations such as mobile telephones ("cellular" telephones) and laptops with mobile termination, and thus can be, for example, portable, pocket, hand-held, computer-included, or car-mounted mobile devices which communicate voice and/or data with the radio access network. The base station, e.g., a radio base station (RBS), is in some networks also called "NodeB" or "B node". The base stations communicate over the air interface (e.g., radio frequencies) with the wireless terminals which are within range of the base stations.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UTRAN is essentially a radio access network providing wideband code division multiple access for user equipment units (UEs). The radio access network in a UMTS network covers a geographical area which is divided into cells, each cell being served by a base station. Base stations may be connected to other elements in a UMTS type network such as a radio network controller (RNC). The Third Generation Partnership Project (3GPP or "3G") has undertaken to evolve further the predecessor technologies, e.g., GSM-based and/or second generation ("2G") radio access network technologies.

The IEEE 802.16 Working Group on Broadband Wireless Access Standards develops formal specifications for the global deployment of broadband Wireless Metropolitan Area Networks. Although the 802.16 family of standards is officially called WirelessMAN, it has been dubbed WiMAX" (from "Worldwide Interoperability for Microwave Access") by an industry group called the WiMAX Forum. For further information regarding WiMAX generally, see, e.g., IEEE Standard 802.16e-2005 and IEEE Standard 802.16-2004/Cor1-2005 (Amendment and Corrigendum to IEEE Standard 802.16-2004), "IEEE Standard for local and metropolitan area networks, Part 16: Air Interface for Fixed and Mobile Broadband Wireless Access Systems, Amendment 2: Physical and um Access Control Layers for Combined Fixed and Mobile Operation in License Bands," Feb. 28, 2006, all of which are incorporated herein by reference in their entireties.

A new standard for mobile broadband is being developed in IEEE 802.16m. The IEEE 802.16m standard utilizes, e.g., orthogonal frequency division multiplexing (OFDM). See, e.g., "IEEE 802.16m System Description Document [Draft]", IEEE 802.16m-08/003r7, incorporated by reference herein in its entirety.

Orthogonal frequency division multiplexing (OFDM) is a special subset of Frequency Division Multiplex (FDM) and is a multi-carrier modulation scheme. In orthogonal frequency division multiplexing (OFDM), the data is simultaneously encoded over various subcarriers. A data stream is split into N parallel streams of reduced data rate and each parallel stream is transmitted on a separate subcarrier. When the subcarriers have appropriate spacing to satisfy orthogonality (e.g., the subcarriers' frequencies differ from each other by integer multiples of the base (lowest) subcarrier frequency), the carriers are mutually orthogonal to each other and their spectra overlap.

Thus, in an Orthogonal Frequency Division Multiplexing (OFDM) system, the data symbols are modulated onto orthogonal time-frequency units of a time-frequency grid or array as defined by the subcarriers of an OFDM symbol. The duration of an OFDM symbol is usually designed to be short enough so that the propagation channel remains unchanged. Within each OFDM symbol, the available bandwidth is divided into a number of orthogonal subcarriers onto which the above-mentioned data symbols are modulated.

OFDM systems typically use known symbols in the time-frequency plane, also known as pilot symbols. Pilot signal design is important since it facilitates multiple functions necessary for operation of the system such as channel estimation, channel quality feedback, multiple-input multiple-output (MIMO) mode adaptation, fine time of arrival estimation and synchronization among others.

Pilot signals are typically designed using regular patterns or some variations of regular patterns in time and frequency. A proposal for an irregular pilot design based on Costas Arrays was made in J. P. Costas, "um Constraints on Sonar Design and Performance", in EASCON Conv. Rec., 1975, pp. 68A-68L, which is incorporated herein by reference in its entirety.

Costas sequences have been used in the design of delay-Doppler radar signal. See, e.g., J. P. Costas, "A Study of a Class of Detection Waveforms Having Nearly Ideal Range—Doppler Ambiguity Properties," Proceedings of the IEEE, Vol. 72, No. 8, August 1984, pp. 996-1009, which is incorporated by reference herein in its entirety. A Costas Sequence $\{\tau_0, \ldots \tau_{L-1}\}$ has the special property that for any given $n \neq 0$, $\tau_m - \tau_{m-n}$ are distinct for all m within the range. This property ensures that any time-frequency shifted Costas array has at most one coincidence with the original pattern.

The advantage of using Costas arrays is that, the pilots used for channel estimation may also be used for cell/sector identification. See U.S. patent application Ser. No. 11/292,415, entitled "HOPPING PILOT PATTERN FOR TELECOMMUNICATIONS"; U.S. patent application Ser. No. 11/760, 654, entitled "NOVEL SIGNATURE SEQUENCES AND METHODS FOR TIME-FREQUENCY SELECTIVE CHANNEL"; and U.S. patent application Ser. No. 11/760, 659, entitled "METHOD AND APPARATUS FOR COMPLEXITY REDUCTION IN DETECTION OF DELAY AND DOPPLER SHIFTED SIGNATURE SEQUENCES"; and U.S. patent application Ser. No. 12/438,623, entitled "DETECTION OF TIME-FREQUENCY HOPPING PATTERNS"; all of which are incorporated herein by reference in its entirety. This enables a reduction in system overhead and increases efficiency. Moreover, the Costas Array provides maximum differentiation between the time-frequency positions used for pilot symbols for various base stations, sectors and antennas.

The existing solutions based on regular patterns or their variations do not provide sufficient differentiation between the pilot patterns of multiple cells/sectors. The existing solution based on the Costas Arrays mainly addresses common pilots (which are to be used by all users), but does not adequately address the design of dedicated pilots (which are to be used only by [e.g., dedicated to] the user receiving the data transmission). Dedicated pilots have more difficult constraints in that good estimation performance based on a small set of pilots is necessary.

SUMMARY

In one of its aspects the technology disclosed herein concerns a radio access network node which comprises a transceiver (configured to communicate a frame of information over an air interface with a wireless terminal) and a multi-pilot frame handler. The frame of information comprises at least one block which, in turn, comprises resource elements structured in a frequency-time plane array. The frequency-time plane array comprises plural frequency subcarriers and plural symbols. The multi-pilot frame handler is arranged to prepare a block of the frame of information to include a first pilot signal of a pilot signal first type and a first pilot signal of a pilot signal second type. The pilot signal of the pilot signal first type is expressed as a first Costas array base pattern of resource elements of the block; the pilot signal of the second type is expressed as a second Costas array base pattern of resource elements of the block. The multi-pilot frame handler is arranged to prepare the block so that any pilot signal of the pilot signal first type is carried by at least some subcarriers of a first set of subcarriers of the block and any pilot signal of the pilot signal second type is carried by at least some subcarriers of a second set of subcarriers of the block; the second set being mutually exclusive relative to the first set.

In an example implementation, the second Costas array base pattern is different than the first Costas array base pattern.

In an example implementation, the pilot signal first type is a common pilot signal and the pilot signal second type is a dedicated pilot signal.

In an example embodiment, the multi-pilot frame handler is arranged to form a second pilot signal of the pilot signal first type in the block by cyclically shifting the first Costas array base pattern of resources in the block and allocating the resources of the block so that the second pilot signal of the pilot signal first type is also carried by the subcarriers of the first set of subcarriers. In an example implementation, for a shift of an integer number M subcarriers in frequency and an integer number N symbols in time, the multi-pilot frame handler is arranged to shift a symbol at index (i,j) in the first Costas array base pattern to an index (mod(i+N, A), mod(j+M,B) to form the second pilot signal of the pilot signal first type (A being an integer number of symbols in the block and B being an integer number of subcarriers in the block). In an example scenario, A is 6, B is 36, and M belongs to a set [0, 3, 6, . . . 33].

In an example embodiment, the multi-pilot frame handler is arranged to form a second pilot signal of the pilot signal second type in the block by cyclically shifting the second Costas array base pattern of resources in the block and allocating the resources of the block so that the second pilot signal of the pilot signal second type is carried by at least some of the subcarriers of the second set of subcarriers.

In an example embodiment, the frame handler is arranged to form a sub-block of resource elements from the block, to use a third Costas array base pattern of resource elements of the sub-block for forming a third pilot signal of the pilot signal second type, and to allocate the resources of the block so that the third pilot signal of the pilot signal second type is carried by at least some subcarriers of the second set of subcarriers.

In an example embodiment, the multi-pilot frame handler is arranged to form a fourth pilot signal of the pilot signal second type in the block by cyclically shifting the second Costas array base pattern of resources in the sub-block and to allocate the resources of the sub-block so that the fourth pilot signal of the pilot signal second type is carried by at least some of the subcarriers of the second set of subcarriers.

In an example embodiment, the frame handler further comprises a modulator for using a data stream to generate plural modulated carriers; an Inverse Fast Fourier Transform (IFFT) unit (for transforming modulated carriers into a sequence of time domain samples); means for applying the sequence of time domain samples to a channel; and means for combining user data and the pilot signals for generating the data stream applied to the modulator.

In another of its aspects the technology disclosed herein concerns a method of operating a node of a radio access network. The method comprises providing a frame of information comprising at least one block; selecting a first set of subcarriers of the block for carrying any pilot signals which serve as a pilot signal of a pilot signal first type; selecting a second set of subcarriers of the block for carrying any pilot signals which serve as a pilot signal of a pilot signal second type (the second set being mutually exclusive relative to the first set); using a first Costas array base pattern of resource elements of the block for forming a first pilot signal of the pilot signal first type and allocating the resources of the block so that the first pilot signal of the pilot signal first type is carried by at least some subcarriers of the first set of subcarriers; using a second Costas array base pattern of resource elements of the block for forming a first pilot signal of the pilot signal second type and allocating the resources of the block so that the first pilot signal of the pilot signal second type is carried by at least some subcarriers of the second set of subcarriers; and, transmitting the frame including the block over a radio interface.

In an example embodiment the method further comprises forming a second pilot signal of the pilot signal first type in the block by cyclically shifting the first Costas array base pattern of resources in the block and allocating the resources of the block so that the second pilot signal of the pilot signal first type is carried by the subcarriers of the first set of subcarriers. In an example implementation, for a shift of an integer number M subcarriers in frequency and an integer number N symbols in time, a symbol at index (i,j) in the first Costas array base pattern is shifted to an index (mod(i+N, A), mod(j+M,B) to form the second pilot signal of the pilot signal first type (A being an integer number of symbols in the block and B being an integer number of subcarriers in the block). In an example scenario, A is 6, B is 36, and M belongs to a set [0, 3, 6, . . . 33].

In an example embodiment the method further comprises forming a second pilot signal of the pilot signal second type in the block by cyclically shifting the second Costas array base pattern of resources in the block and allocating the resources of the block so that the second pilot signal of the pilot signal second type is carried by at least some of the subcarriers of the second set of subcarriers.

In an example embodiment the method further comprises forming a sub-block of resource elements from the block; using a third Costas array base pattern of resource elements of the sub-block for forming a third pilot signal of the pilot signal second type and allocating the resources of the block so that the third pilot signal of the pilot signal second type is carried by at least some subcarriers of the second set of subcarriers.

In an example embodiment the method further comprises forming a fourth pilot signal of the pilot signal second type in the block by cyclically shifting the second Costas array base pattern of resources in the sub-block and allocating the resources of the sub-block so that the fourth pilot signal of the pilot signal second type is carried by at least some of the subcarriers of the second set of subcarriers.

In another of its aspects the technology disclosed herein concerns a node of a radio access network and a method of operating the same in which plural blocks structured in the manner described herein are included in a frame. A first group of the plural blocks have at least one pilot signal thereof expressed by a first time-frequency shift and at least a second group of the plural blocks have at least one pilot signal thereof expressed by a second time-frequency shift (which is different from the first time-frequency shift). The first group of the plural blocks and the second group of plural blocks are located in the frame according to a pattern, e.g., blocks belonging to the same time-frequency shift are situated in certain (e.g., continuous) rows or columns of the frame.

In one of its aspects the technology disclosed herein concerns generating a base pattern for one antenna by superimposing a Costas array and a time-frequency shifted version thereof within one block.

In another of its aspects, the technology disclosed herein concerns a wireless terminal comprising a wireless terminal frame handler which is able to process frames having blocks structured according to the techniques described herein. Once the wireless terminal frame handler obtains the pilot signal(s) from the block, a pilot signal utilization unit utilizes the pilot signal of a pilot signal first type and the pilot signal of a pilot signal second type for at least one of base station identification, channel estimation, or synchronization.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented on tangible media in computer readable form and so executed by a computer or processor, whether or not such computer or processor is explicitly shown.

The functions of the various elements including functional blocks labeled or described as "processors" or "controllers" may be provided through the use of dedicated hardware as well as hardware capable of executing software (e.g., stored on computer readable medium/media). When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 1:
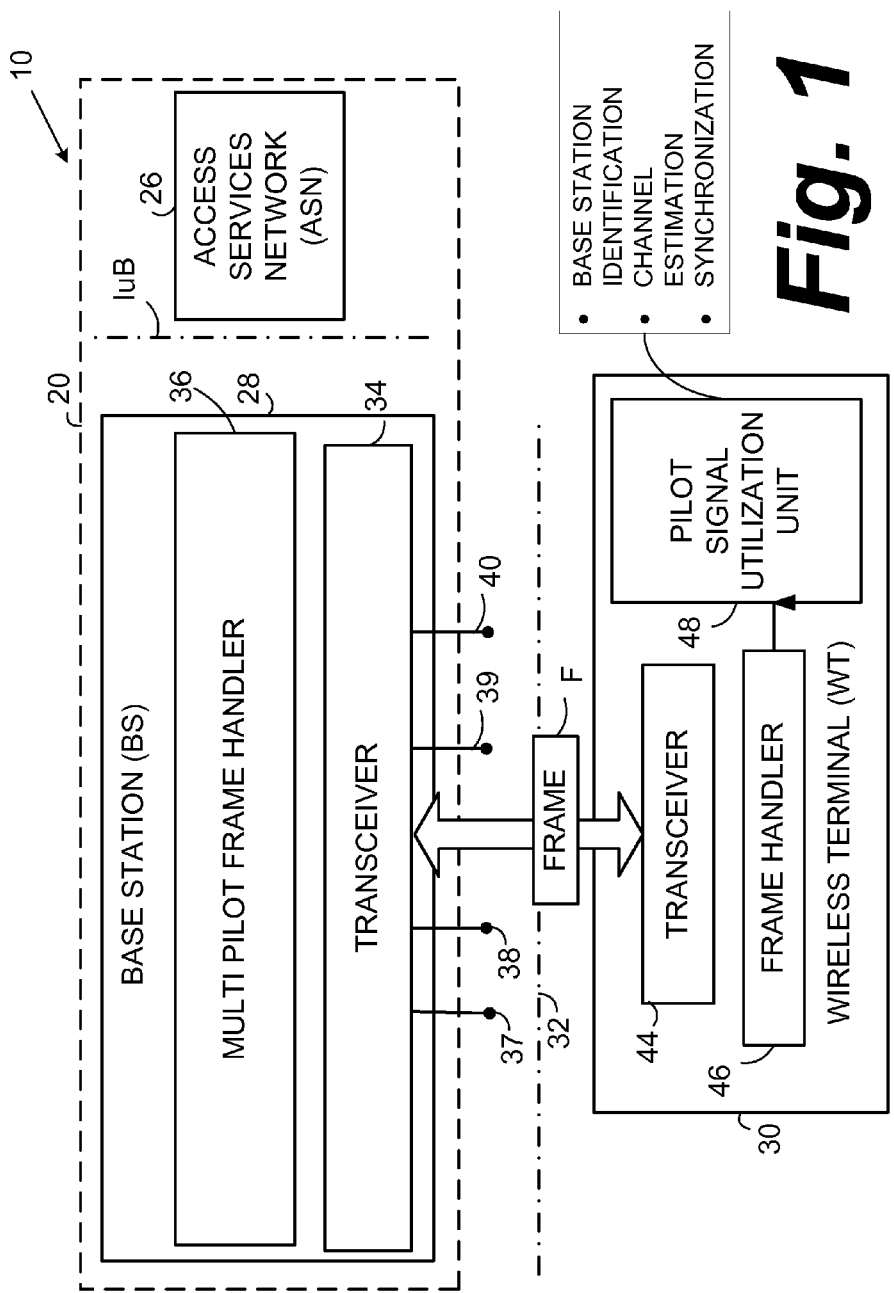
FIG. 1 is a diagrammatic view of a telecommunications network including a base station node which comprises a multi-pilot frame handler.

FIG. 1 shows telecommunications system 10 as comprising a radio access network 20 which can be connected to one or more external (e.g., core) networks. The external networks may comprise, for example, connection-oriented networks such as the Public Switched Telephone Network (PSTN) and/or the Integrated Services Digital Network (ISDN), and/or connectionless external core network such as (for example) the Internet. One or more of the external networks have unillustrated serving nodes such as, e.g., an Access Services Network (ASN) Gateway node working in conjunction with one or more Core Services Network (CSN) components.

The radio access network (RAN) 20 includes one or more Access Services Network (ASN) nodes 26 and one or more radio base stations (RBS) 28. For sake of simplicity, the radio access network (RAN) 20 of FIG. 1 is shown with only one ASN node 26 and one base station node 28. Typically each ASN 26 is connected to one or more base stations (BS) 28, but the number of nodes is not necessarily germane to the present technology. Those skilled in the art will also appreciate that a base station is sometimes also referred to in the art as a radio base station, a node B, eNodeB 28, or B-node (all of which are used interchangeably herein).

As shown in FIG. 1, a wireless terminal (WT) 30 communicates with one or more cells or one or more base stations 28 over a radio or air interface 32. In differing implementations, the wireless terminal (WT) 30 can be known by different names, such as mobile terminal, mobile station or MS, user equipment unit (UE), handset, or remote unit, for example. Each mobile terminal (MT) may be any of myriad devices or appliances, such as mobile phones, mobile laptops, pagers, personal digital assistants or other comparable mobile devices, SIP phones, stationary computers and laptops equipped with a real-time application, such as Microsoft netmeeting, Push-to-talk client etc.

As shown in FIG. 1, in an example embodiment base station 28 comprises base station transceiver 34 and base station frame handler 36. Transceiver 34 is involved in communicating frame(s) of information (illustrated as frame F in FIG. 1) over air interface 32 with wireless terminals participating in a connection with base station 28. The transceiver 34 includes both a transmitter(s) for transmitting downlink (DL) portions or bursts of frames, as well as a receiver(s) for receiving uplink (UL) portions or bursts of frames. As used herein, "transceiver" can include one or more transceivers and further encompasses radio transmission and/or reception equipment suitable for transmitting/receiving a data stream or the like in the form of plural subcarriers or subchannels (such as in OFDMA and SC-FDMA, for non-limiting examples), including plural antennas when appropriate.

As an example, the transceiver 34 of the base station node 28 of FIG. 1 includes four transmit antennas 37, 38, 39, and 40 (in addition to other unillustrated receive antennas). It should be understood that a different number of antennas may be employed at base station node 28. The plural transmit antennas are employed to provide different MIMO streams. Each stream is transmitted by all antennas, but the number of streams is limited by the minimum number of transmit and receive antennas. Thus, the "rank" of the base station is four, with the result that either one, two, three, or four MIMO streams may be transmitted depending on the number of receive antennas at the wireless terminal 30. Again it should be understood that, in other example embodiments, the base station may have a different number of antennas and thus a different rank.

The base station frame handler 36 is involved in processing frames (such as frame F) which are communicated between base station 28 and wireless terminals such as wireless terminal (WT) 30. The frame of information comprises at least one block which, in turn, comprises resource elements structured in a frequency-time plane array. The frequency-time plane array comprises plural frequency subcarriers and plural symbols. More detailed aspects of structure and composition of the frames F are discussed subsequently.

Typically the frame(s) have both downlink (DL) portions or bursts and uplink (UL) portions or bursts, so that frame handler 36 in turn comprises a base station frame formatter (which facilitates preparation of the downlink (DL) bursts prior to transmission by transceiver 34) and a base station frame deformatter (which facilitates processing of the uplink (UL) bursts as received by transceiver 34 from wireless terminal (WT) 30). For reasons described herein, the base station frame handler 36 is also known as the multi-pilot frame handler 36 and as such, in an example embodiment, can be realized by one or more computers, processors, or controllers as those terms are herein expansively explained.

For sake of simplicity, FIG. 1 does not show other well-known functionalities and/or units of base station 28, such as (by way of non-limiting example) interfaces to other nodes of the radio access network (RAN); queues through which data is collected or assembled preparatory to inclusion in the downlink (DL) bursts configured by the base station frame formatter; generators or processors for preparing signaling information for inclusion in the downlink (DL) bursts configured by the frame formatter; queues into which data obtained from uplink (UL) bursts are stored after processed by the base station deformatter; units of base station 28 which utilize the data and/or signaling included in uplink (UL) bursts; or node processors or the like which supervise or coordinate the constituent units or functionalities of base station 28.

FIG. 1 shows wireless terminal (WT) 30 communicating/exchanging a frame F with base station 28 over air interface 32. Wireless terminal (WT) 30 comprises wireless terminal transceiver 44; wireless terminal frame handler 46; and pilot signal utilization unit 48. The wireless terminal frame handler 46 in turn comprises both an unillustrated wireless terminal frame formatter and an unillustrated wireless terminal frame deformatter. The wireless terminal frame formatter serves, e.g., to prepare uplink (UL) bursts of the frames prior to transmission to base station 28 by wireless terminal transceiver 44. The wireless terminal deformatter of frame handler 46 serves, e.g., to process downlink (DL) bursts received by transceiver 44 over air interface 32 from base station 28. As shown in FIG. 1, the pilot signal utilization unit 48 is configured to utilize the pilot signal of a pilot signal first type and the pilot signal of a pilot signal second type for at least one of base station identification, channel estimation, or synchronization. The wireless terminal frame handler 46 and pilot signal utilization unit 48 can either together or separately be realized by one or more computers, processors, or controllers as those terms are herein expansively explained.

Returning to base station 28, multi-pilot frame handler 36 is arranged to prepare a block of the frame of information to include plural pilot signals, and even plural types of pilot signals. For example, multi-pilot frame handler 36 can be configured to prepare a block of the frame of information to include one or more pilot signals of a pilot signal first type (e.g., common pilot signals) as well as one or more pilot signals of a pilot signal second type (e.g., dedicated pilot signals). As explained herein, the pilot signal of the pilot signal first type (e.g., common pilot signal) can be expressed as a first Costas array base pattern of resource elements of the block; the pilot signal of the second type (e.g., dedicated pilot signal) can be expressed as a second Costas array base pattern of resource elements of the block. As also described herein, the multi-pilot frame handler 36 is arranged to prepare the block so that any pilot signal of the pilot signal first type (e.g., common pilot signals) is carried by at least some subcarriers of a first set of subcarriers of the block and any pilot signal of the pilot signal second type (e.g., dedicated pilot signals) is carried by at least some subcarriers of a second set of subcarriers of the block (the second set being mutually exclusive relative to the first set).

The person skilled in the art will note that the terms "pilot signal" and "pilot sequence" are used interchangeably herein.

Figure 2:
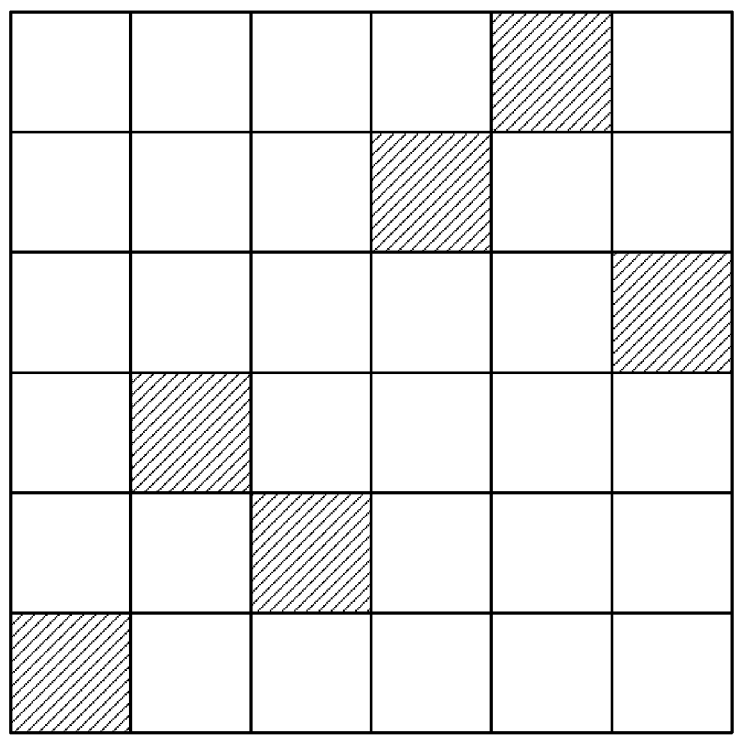
FIG. 2 is a diagrammatic view of a Costas Array of length six which is employed in example manner to illustrate some aspects of the technology disclosed herein.

FIG. 2 shows a Costas Array of length six which is employed in example manner to illustrate some aspects of the technology disclosed herein. By "length six" is meant that the Costas Array comprises six units in each dimension, e.g., six units in the horizontal direction (which represents OFDM symbols in time) and six units in the vertical direction (which represents frequency subcarriers). The Costas array of FIG. 2 comes from the Costas sequence {0, 2, 1, 5, 3, 4}, with the numbers in the sequence indicating how many symbols to the right the pilot in each row is shifted. Like all Costas arrays, the array of FIG. 2 has a uniqueness property in that cyclical shifts of the array have very few coincidences with the original pattern. For example, the array in FIG. 2 has the property that all shifts in time and frequency have at most two coincidences with the original pattern. This uniqueness property is an advantage that the Costas array has over regular patterns.

Figure 3:
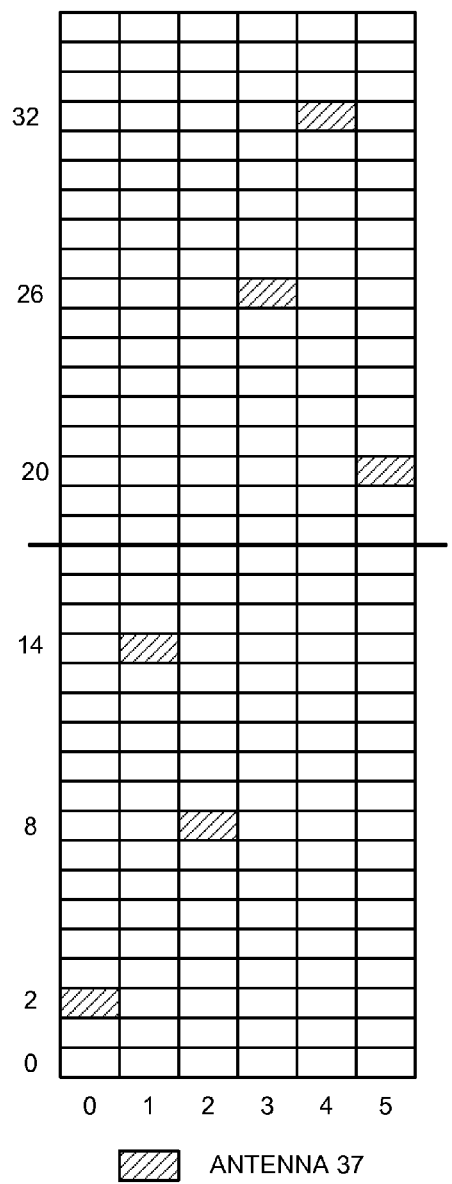
FIG. 3 is a diagrammatic view of a Costas array base pattern impressed on a block of an information frame and which can serve as a base pattern for one or more common pilot signals for antennas of a base station.

A pilot signal design is disclosed herein that allows the use of common and dedicated pilots based on the same underlying Costas array structure. As just mentioned, for sake of illustration, the basic Costas array pattern used in some of the examples described herein is that example shown in FIG. 2. For example, FIG. 3 shows a Costas array pattern that is formed by distributing the Costas array pattern of FIG. 2 over a block of resource elements, the block of FIG. 3 being dimensioned over a group of 36 subcarriers and 6 symbols. It will be seen that the FIG. 3 Costas array pattern is formed from the pattern of FIG. 2 by starting the lowermost row of the FIG. 2 array in the third row (subcarrier 2) of the FIG. 3 array, and then spacing five subcarriers of the FIG. 3 array between the five remaining rows of the FIG. 2 array. For example, the lowermost row of the FIG. 2 array corresponds to subcarrier 2 of the FIG. 3 array (the lowermost subcarrier of FIG. 3 being numbered as zero), and the successively higher rows of the FIG. 2 array corresponding to subcarriers eight, fourteen, twenty, twenty six, and thirty two of the FIG. 3 array. The symbol positions of the FIG. 3 array are the same as the FIG. 2 array.

The Costas array pattern of FIG. 3 can be used, for example, as a common pilot signal/sequence for a particular base station antenna. A common pilot signal is an example of what is termed herein as a "first type of pilot signal". In fact, the association of a base station antenna with this particular Costas array pattern (using this particular Costas array pattern for the common pilot signal for the base station antenna) can be used to identify the transmitted signal as emanating from or belonging to the cell served by the associated base station antenna. Of course, common pilot signals can be used for other functions in addition to cell identification.

For sake of illustration, the Costas array base pattern of FIG. 3 will be used for the common pilot signal of antenna 37 of the base station node 28. For example, to distinguish other antennas (e.g., antennas 38, 39, and 40) of the same base station, the pattern for all antennas other than the first antenna (e.g., the patterns for antennas 38, 39, and 40) are obtained by performing respective time-frequency shifts of the pattern for the first antenna. Only shifts in frequency and/or time of the pattern for the first antenna that ensure that the pilot symbols for the two patterns do not overlap are used.

Figure 4:
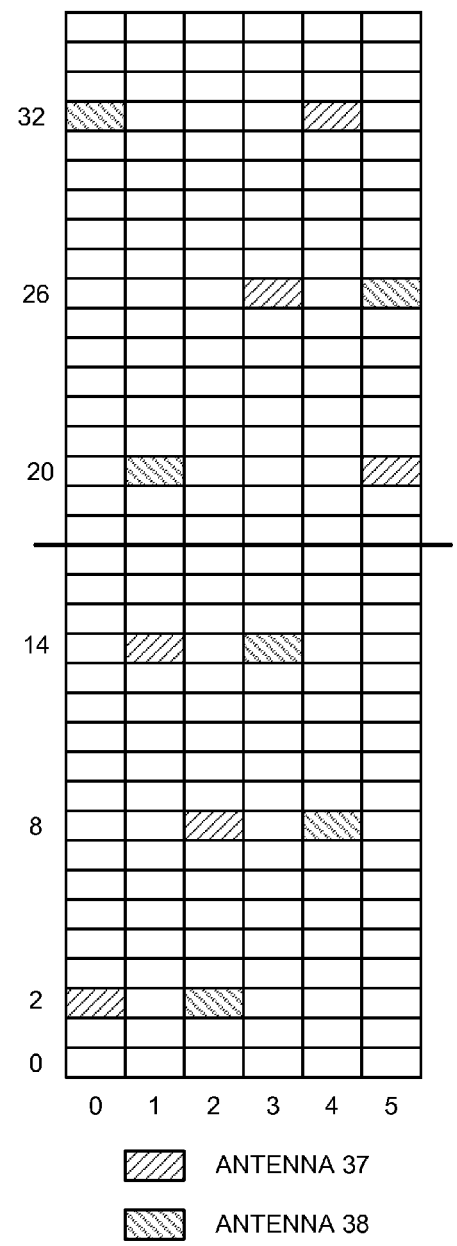
FIG. 4 is a diagrammatic view of a Costas array pattern derived by shifting the Costas array base pattern of FIG. 3 and which is impressed on a block of an information frame to serve as a common pilot signal for a second antenna of a base station.

As an example of the foregoing, the Costas array base pattern of FIG. 3 (which serves as the common pilot signal for antenna 37) can be shifted through a first shift to form the common pilot signal for another antenna of the base station node 28, such as antenna 38. Such a first shift is illustrated in FIG. 4, in which the Costas array pattern of FIG. 3 has been shifted two symbols to the right to form a Costas array pattern which serves as the common pilot signal for antenna 38 of the base station node 28 of FIG. 1.

Costas array patterns for the common pilot signals of other antennas (e.g., antennas 39 and 40) of the base station node 28 can similarly be formed by appropriate shifts of the Costas array pattern of FIG. 3. The Costas array pattern of FIG. 3 can be shifted along the horizontal axis in a symbol direction in the manner illustrated by FIG. 4. Alternatively, the Costas array pattern of FIG. 3 can be shifted along the vertical axis to other subcarriers, as described in more detail herein.

It is to be noted that some time-frequency shifts of the base patterns have overlaps with the base pattern, while some time-frequency shifts do not. When only shifts in time or only shifts in frequency are used, there is no overlap. Interference between patterns assigned to antennas of the same base station can be minimized by ensuring that all patterns assigned to a base station's antennas are just shifts of each other only in time or in frequency. As an example, let the tuple (x,y) denote a cyclic time-frequency shift. Assume also that all base stations have four antennas. Then, a first base station might use a time-frequency shift of (0,0), (1,0), (2,0) and (3,0) for its four antennas. The pilot patterns of the first base station (base station 1) will then use subcarriers {2, 8, 14, 20, 26, 32}. A second base station (i.e., base station 2) might use a time-frequency shift of (0,6), (1,6), (2,6), (3,6). Then the patterns assigned to base station 2 also use subcarriers {2, 8, 14, 20, 26, 32}. However, the patterns assigned to the four antennas of base station 2 do not overlap with each other and neither do the patterns assigned to the four antennas of base station 1. However, any of the patterns assigned to base station 1 might have overlaps with patterns assigned to base station 2.

While common pilot signals may be used for cell identification and other functions, there is another type of pilot signal known as a dedicated pilot signal. A dedicated pilot signal is an example of what is termed herein as a "second type of pilot signal". There is a dedicated pilot sequence for each stream transmitted by the base station, with the number of streams being less than or equal to the number of antennas. Therefore, for the four-antenna base station of FIG. 1, there may be either one, two, three, or four dedicated pilot signals. At a base station dedicated pilots may mostly be used for channel estimation to aid in demodulating and decoding data transmissions received by a user. An aspect of the technology disclosed herein is that both common and dedicated pilot sequences for base stations and different antennas at a base station are all generated from cyclical time frequency shifts of a (one or more) Costas array base pattern.

One aspect of the technology disclosed herein involves the multi-pilot frame handler 36 selecting a first set of time-frequency resources of the block for carrying any pilot signals which serve as a pilot signal of a pilot signal first type (e.g., the common pilot signals) and selecting a second set of time-frequency resources of the block for carrying any pilot signals which serve as a pilot signal of a pilot signal second type (e.g., the dedicated pilot signals). The second set of time-frequency resources is mutually exclusive relative to the first set. In an exemplary embodiment, the time-frequency resources are split between the pilot signals of the first and second types by assigning different mutually exclusive sets of subcarriers to the pilot signals of the first and second types.

In view of the demarcation served by the first set of subcarriers and the second set of subcarriers, any shifting of a Costas array pattern along the vertical direction of the block (shifting of subcarriers) to derive another Costas array pattern must be in accordance with the set definitions. For example, to generate a Costas array pattern for another common pilot signal for another antenna (e.g., antenna 39) of base station node 28 of FIG. 1, the Costas array pattern of FIG. 3 can be shifted only in such a manner that the subcarriers utilized by the shifted Costas array pattern belong to the first set of subcarriers. On the other hand, if a dedicated pilot signal is being created by a shift of a Costas array pattern, the subcarriers utilized by the shifted Costas array pattern must belong to the second set of subcarriers.

In an exemplary embodiment, to ensure that this restriction or partitioning between the first and second sets of subcarriers is maintained, different time-frequency shifts applied to the base patterns for a pilot signal of a certain type are restricted so that the subcarriers utilized by the shifted pattern belong to the set of subcarriers assigned to the pilot signal of that type.

In an exemplary embodiment, the restriction of time-frequency shifts is done so that the common pilots are allocated to cyclic shifts in frequency that are limited to multiples of three subcarriers. Therefore, possible shifts in frequency are in the set [0, 3, 6, . . . , 33] subcarriers. Cyclic shifts in time are not restricted, and therefore shifts of up to six symbols in time are possible. For a shift of an integer number M subcarriers in frequency and integer number N symbols in time, the symbol at index (i,j) in the base pattern, i.e., at subcarrier index j and symbol index i ($0<=i<=5$, $0<=j<=35$) is shifted so as to be transmitted at index (mod(i+N,6), mod(j+M,36)). For the common pilot signal in the example just given, M belongs to the set [0, 3, 6, . . . , 33].

Similarly, the dedicated pilots are allocated a different set of subcarriers in frequency (i.e., the second set of subcarriers). Dedicated pilot sequences are generated using a set of shifts similar to those used for the common pilot but in a different set of subcarriers so that all the generated pilot sequences remain within the set of subcarriers allocated to the dedicated pilot sequences. Thus, the dedicated pilot may occupy frequency subcarriers [1, 2, 4, 5, 7, 8, . . . , 34, and 35].

Figure 5:
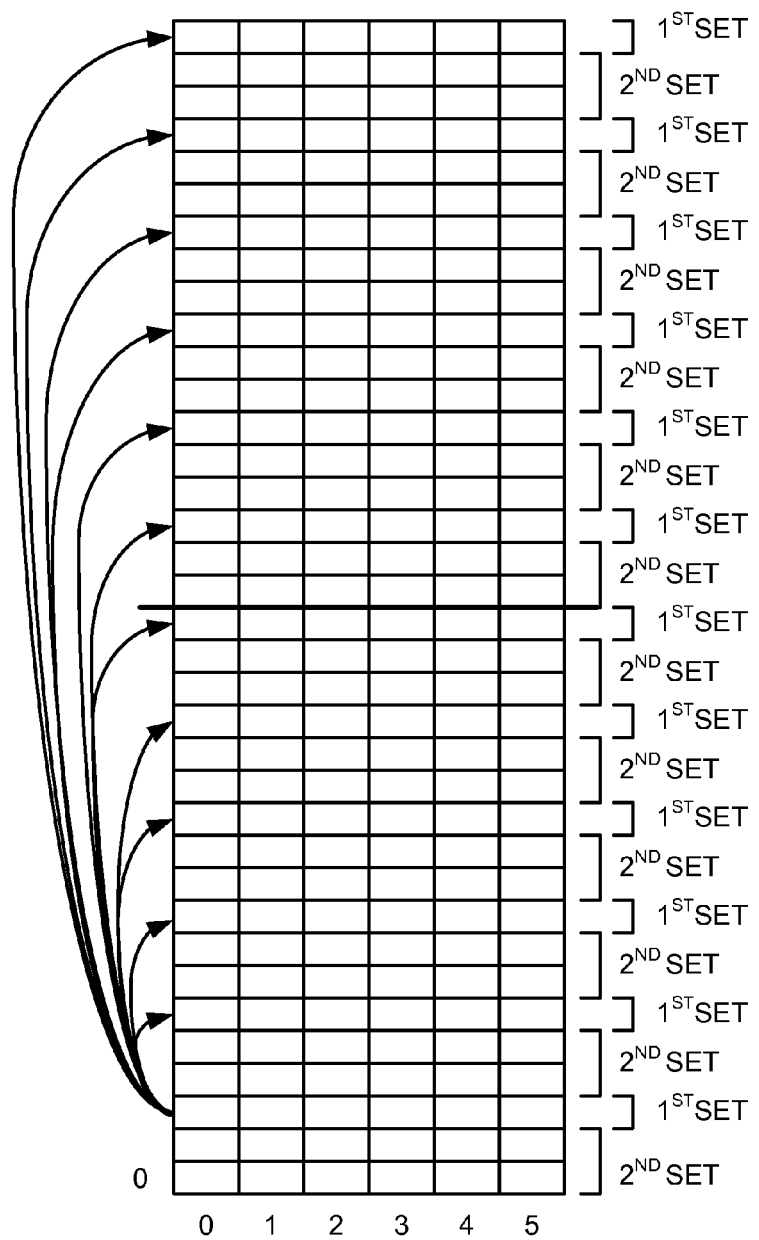
FIG. 5 is a diagrammatic view showing division of subcarriers of a block into a first set of subcarriers allocatable to a first type of pilot signal and a second set of subcarriers available for allocation to a second type of pilot signal.

FIG. 5 illustrates, with reference to an example block, which subcarriers are allocated to the first set of subcarriers and which subcarriers are allocated to the second set of subcarriers in the example embodiment. FIG. 5 further illustrates by multi-partitioned arrow to what subcarriers of the block the lowermost subcarrier comprising the Costas array pattern of FIG. 3 (e.g., subcarrier 2) may be assigned. FIG. 5 shows that the lowermost subcarrier comprising the Costas array pattern of FIG. 3 can be assigned to the other subcarriers of the first set of subcarriers, e.g., to either of subcarriers 5, 8, 11, 14, 17, 20, 23, 26, 29, 32, 35.

Thus, the base pattern is cyclically shifted by a number of frequency subcarriers that is in the set [0, 3, 6, . . . , 33] subcarriers, to generate the pilot patterns for common pilots. Due to the cyclical nature of the shift this ensures that common pilots in a tile of 36 subcarriers×6 symbols never appear in subcarriers outside of the set {2, 5, 8, 11, . . . , 35} (numbering starts from 0) and that this set is effectively reserved for common pilot sequences. However, a given pattern appears in fewer subcarriers. So, for example if the shift of 0 subcarriers is used, the common pilots appear in subcarriers {2, 8, 14, 20, 26, 32}.

Within each set of frequency shifts, all the frequency shifts in the set and time shifts are used to distinguish between different base stations, sectors and antennas. For example, within the set of subcarriers used for the common pilots, different frequency and time shifts may be used to distinguish between the common pilots of different base stations or different antennas. It should also be appreciated that a different Costas array pattern than the Costas array pattern of FIG. 3 may be used for the common pilot signals. Additionally different Costas array patterns may be used for different pilot types such as common and dedicated pilots or for some subsets of pilots within each category. Within each pilot type or subset of a pilot type, cyclic time and frequency shifts of the same pattern would be used by various antennas and base stations.

For the block size shown in FIG. 5, there are a total of 36×6=216 time/frequency shifts that may be used. Thus, there are 216 distinct patterns. For a base station such as that of FIG. 1 which has four antennas, out of the thirty six possible shifts in frequency, two out of every three shifts must be reserved for dedicated pilots. This leaves only twelve shifts for common pilots. Thus there are 12×6 possible time-frequency shifts for common pilots, i.e., seventy-two shifts. With four antennas at each base station one can assign distinct sets with four common pilot patterns in each set to a maximum of eighteen base stations. In the set of two out of three, with every three subcarriers assigned to dedicated pilots, one may use different time-frequency shifts of the same base pattern as the common pilot pattern (FIG. 2) for some streams while there may be shifts of a different base pattern for other streams.

It is an aspect of the technology disclosed herein to increase the ability to distinguish between base stations by varying the Costas array used across time and frequency. This is done by choosing different time frequency shifts as described herein.

The pattern obtained for a certain base station and antenna by performing cyclic shifts of the base pattern is repeated in frequency and time. The number of repetitions in frequency depends on the channel bandwidth and the number of repetitions in time depends on the length of the frame allocated to the downlink.

A cell may be identified by correlating with the unique time-frequency pilot pattern assigned to it. Repetitions of the base pattern in frequency or in time may use different cyclic shifts. For example, if twelve repetitions in frequency of the thirty six subcarriers by six symbol block are required to cover the entire bandwidth, the twelve repetitions may be split into four sets or groups of three contiguous blocks each. The thirty six by six subcarrier-symbol block in each of the sets may use the same cyclic shift of the base pattern while different sets may use different cyclic shifts.

Figure 12:
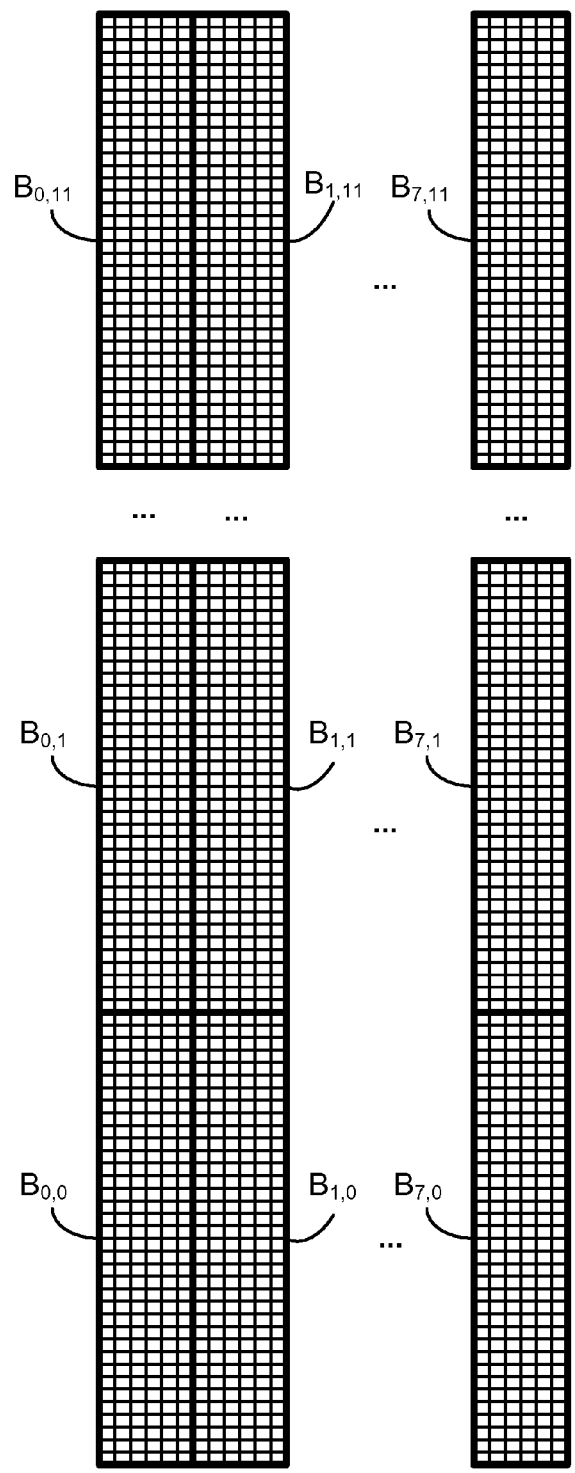
FIG. 12 is a diagrammatic view of a frame comprising plural blocks.

Suppose, for example, that there are a total of 36×12=432 subcarriers in frequency and 6×8=48 subcarriers in time in a frame, as illustrated in the frame of FIG. 12. The basic time-frequency block as shown in FIG. 3 is 36 subcarriers×6 symbols. Hence, in the frame of 432 frequency subcarriers and 48 symbols there are 12 blocks $B_{i,0}$-$B_{i,11}$ in frequency for each column i of the frame and 8 blocks in time for each row of the frame. The pattern defined for a single block $B_{ij}$ may thus be repeated in the frame in both time (8 blocks along the horizontal) and frequency (12 blocks along the vertical), as shown in FIG. 12.

Alternatively, the frame may include plural blocks structured in the manner described herein, with at least a first group or set of the plural blocks having at least one pilot signal thereof expressed by a first time-frequency shift and at least a second group of the plural blocks have at least one pilot signal thereof expressed by a second time-frequency shift (which is different from the first time-frequency shift). For example, a certain time frequency shift may be used for the first three blocks in frequency (e.g., the first three rows of the frame), then a different time-frequency shift used for the next three blocks in frequency (e.g., the next three rows of the frame), and so on. In this way there will be four different time frequency shifts over the 12 blocks in frequency (e.g., over each column of the frame). Similarly, the same time frequency shift may be used for the first two blocks in time (e.g., the first two columns of the frame) and a different time-frequency shift used for the next two blocks in time (e.g., over the next two columns), and so on. The first group of the plural blocks and the second group of plural blocks may be located in the frame according to a pattern. In the above alternatives, one pattern is for plural blocks having the same time frequency shift to be situated in certain specified (e.g., contiguous) rows or columns of the frame Mention has been made above to dedicated pilot signals, which are an example of a second type of pilot signal. As also mentioned above, there is a dedicated pilot sequence for each stream transmitted by the base station, with the number of streams being less than or equal to the number of antennas. Dedicated pilots may mostly be used for channel estimation to aid in demodulating and decoding data transmissions received by a user. As an example aspect of the technology disclosed herein, both common pilot sequences and dedicated pilot sequences for base stations and different antennas at a base station are all generated from cyclical time frequency shifts of a Costas array base pattern.

Dedicated pilots are typically precoded in the same manner as data transmissions within the user allocation. Thus, when a small block of resources is allocated to a user, the user performs channel estimation and other functions based only on the pilots within this allocation. In IEEE 802.16m, the smallest allocation may be a block of 18 subcarriers×6 symbols. In order to facilitate good channel estimation performance with small allocations, it is desirable to increase the density of pilots for dedicated pilots. Thus, for dedicated pilots, it is useful to have 6 pilots within an 18×6 block instead of 3 symbols as is the case with the pattern in FIG. 3 for common pilots.

When a pattern such as the one with 6 pilot symbols shown in FIG. 3 is used in the 18×6 block, some of the edges of the block are not close enough to any pilot symbols. This leads to degradation in the channel estimates at the edges of the block under stringent conditions such as high Doppler and/or delay spread. The use of any traditional Costas array pattern within the block of 18×6 subcarriers results in such low density of pilots near some edges of the block.

Figure 6:
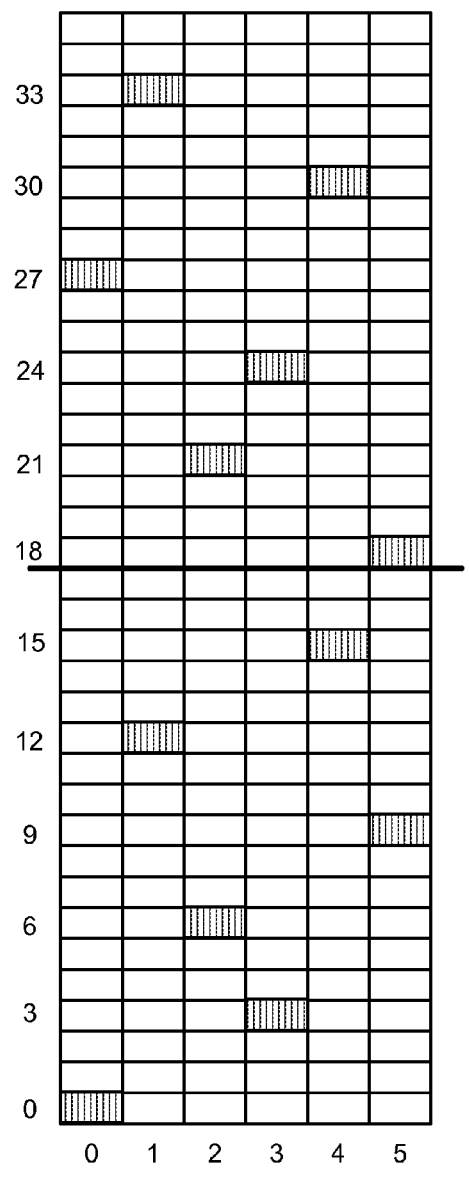
FIG. 6 is a diagrammatic view of a Costas array base pattern impressed on a block of an information frame and which can serve as a base pattern for one or more dedicated pilot signals for data streams transmitted from a base station.

In order to ensure robust performance in this scenario, while maintaining the density of 6 pilots within the block of 18 subcarriers by 6 symbols, the technology disclosed herein includes the use of two Costas array patterns spanning a 36×6 block to generate a base pattern. This is illustrated in FIG. 6, wherein the base pattern for dedicated pilots shown is a superposition of the pattern shown in FIG. 3 and a cyclic time and frequency shifted version of the same pattern. Thus, there are two Costas array patterns, i.e., a total of 12 pilot symbols, in the 36×6 block with the second pattern being a time-frequency shifted version of the original pattern. This results in the desired density of 6 pilot symbols in a block of 18×6 symbols while ensuring that all edges of the 18×6 block are sufficiently close to a pilot symbol resulting in good channel estimation performance with small user allocations.

It was mentioned previously that as many as four dedicated pilot signals may be utilized for base station node 28 of FIG. 1. The dedicated pilots are assigned a set of subcarriers that is orthogonal to the set of subcarriers used by the common pilots. For sake of illustration, the first two dedicated pilot signals for the base station node 28 of FIG. 1 can be based on a Costas array based base pattern such as that shown in FIG. 6. Note that, in this particular example, the Costas array base pattern of FIG. 6 is different than that of FIG. 3, but is provided over a block of 36 subcarriers and six symbols in time and is derived from two Costas array patterns of the type shown in FIG. 3.

Figure 7:
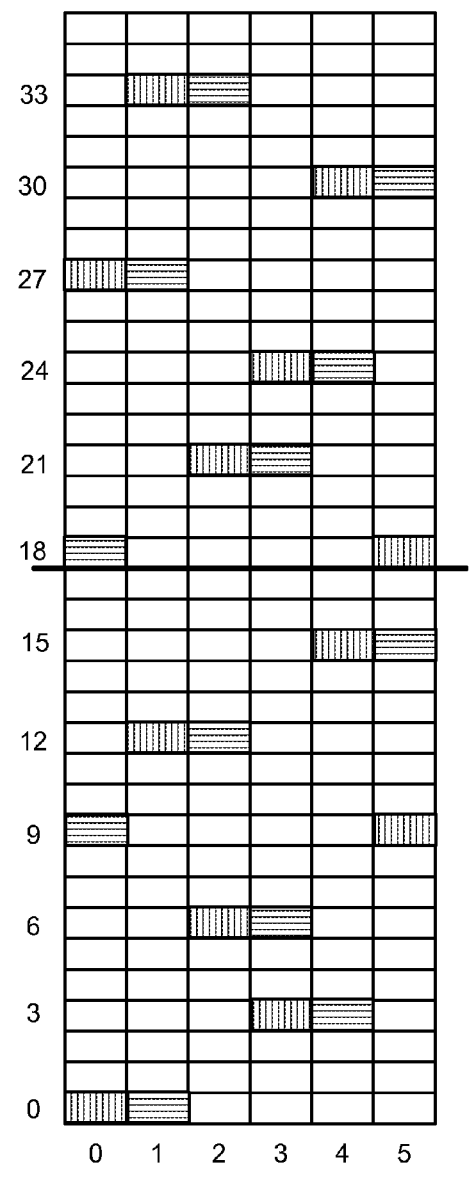
FIG. 7 is a diagrammatic view of a Costas array pattern derived by shifting the Costas array base pattern of FIG. 6 and which is impressed on a block of an information frame to serve as a dedicated pilot signal for a second data stream transmitted from a base station.

The Costas array based base pattern of FIG. 6 is a base pattern for both the dedicated pilot signal for both the first and second MIMO streams transmitted from base station node 28. The Costas array based base pattern of FIG. 6 is actually used as the pattern for dedicated pilot signal for the first stream, while a shifted version thereof which is shown in FIG. 7 is used as the Costas array pattern for the dedicated pilot signal for the second stream. The Costas array based pattern of FIG. 7 is derived from the Costas array based base pattern of FIG. 6 by a right shift of one symbol in time. The Costas array patterns for both the dedicated pilot signals of the first stream and the second stream exist over the entire block, e.g., over the 36 subcarrier by 6 symbol in time grid.

Dedicated pilot sequences for different streams and base stations are generated by cyclically shifting whatever base pattern is utilized within the 36×6 subcarrier-symbol block, and essentially in the same manner as is done for common pilots. For dedicated pilot sequences, cyclic shifts in frequency are limited to multiples of 6 subcarriers. Therefore, possible shifts in frequency are in the set [0, 6, . . . , 30] subcarriers.

For dedicated pilot signals cyclic shifts in time are not restricted and therefore shifts of up to six symbols in time are possible. Thus, for a shift of M integer number of subcarriers in frequency and N integer number of symbols in time, the symbol at index (i,j), i.e., at subcarrier index j and symbol index i ($0<=i<=5$, $0<=j<=35$) may be represented as (mod(i+N,6), mod(j+M,36)). For the dedicated pilot for streams 1 and 2, M belongs to the set [0, 6, . . . , 30].

For two streams from the same base station, only shifts in frequency and/or time of the base pattern that ensure that the pilot symbols for the two streams do not overlap are used. Such is the example of FIG. 7, which shows dedicated pilot symbols for two streams transmitted from the same base station.

It should be noted that two different Costas array base patterns have thus far been utilized for the pilot sequences of base station node 28. The two common pilot sequences for antenna 37 and 38 were based on the Costas array base pattern of FIG. 3, while the dedicated pilot sequences for the first and second MIMO streams of base station node 28 are based on the base pattern of FIG. 6 derived from the superposition of two Costas array patterns. FIG. 4 shows how a second common pilot signal can be derived from a shift of the first common pilot signal of FIG. 3, while in similar fashion FIG. 7 shows how a dedicated pilot signal for a second MIMO stream can be derived from a shift of the dedicated pilot signal for the first MIMO stream of FIG. 6.

Thus far all pilot signals have been illustrated as based or formed over an entire block, and thus had a "size" of the entire block. In the examples illustrated thus far, such a block has comprised thirty six subcarriers by six symbols in time. Block size is not limited to the illustrative example. Rather, as now explained, a further aspect of the technology disclosed herein is that multiple Costas array base patterns of different sizes may be used simultaneously on different sets of subcarriers or OFDM symbols, to serve the need for multiple types of pilots.

Whereas FIG. 3 showed a Costas array that spans thirty six subcarriers and six OFDM symbols in time, the technology disclosed herein encompasses resource block allocations that are smaller in the frequency dimension than the entire block of subcarriers (e.g., smaller than thirty six subcarriers). For example, and as illustrated by FIG. 8, an allocation of eighteen subcarriers by six symbols may be used for a single user, e.g., a Costas array pattern covering a sub-block may also be employed.

In the example illustration thus far provided, FIG. 4 depicts the common pilot signals for antennas 37 and 38 of the base station node 28 of FIG. 1, while FIG. 7 shows the dedicated pilot signals for the first and second MIMO streams transmitted by base station node 28. The third and fourth MIMO streams transmitted by base station node 28 provide examples of the different-sized Costas array base pattern that can be advantageously used according to the technology disclosed herein.

Figure 8:
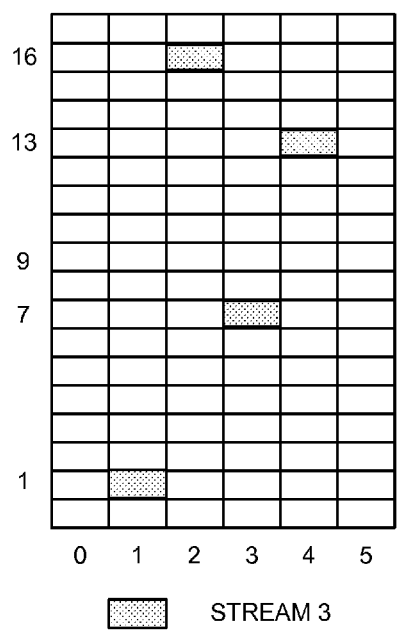
FIG. 8 is a diagrammatic view of a Costas array base pattern impressed on a sub-block of an information frame and which can serve as a base pattern for one or more dedicated pilot signals transmitted from a base station.
Figure 9:
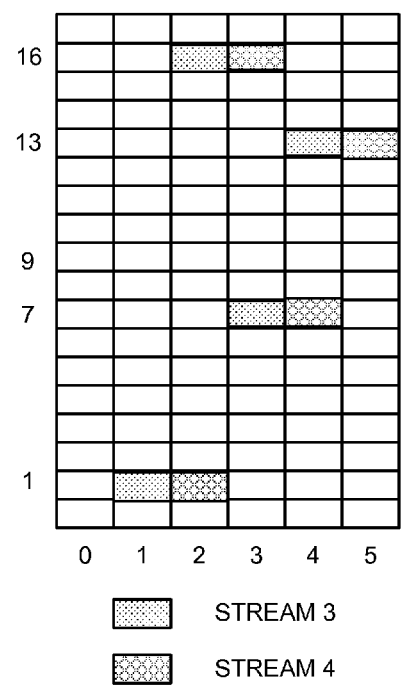
FIG. 9 is a diagrammatic view of a Costas array pattern derived by shifting the Costas array base pattern of FIG. 8 and which is impressed on a sub-block of an information frame to serve as a dedicated pilot signal for multiple data streams transmitted from a base station.

FIG. 8 shows a Costas array base pattern from which the dedicated pilot signals for the third and fourth MIMO streams are derived for the particular example under discussion. Of course, other Costas array base patterns can be used for other illustrations. FIG. 8 actually shows the Costas array pattern for the dedicated pilot signal for the third stream (the base pattern and actual pattern are one and the same), while FIG. 9 shows how the dedicated pilot signal for the fourth stream is derived in this example by a shift (one symbol right in time) from the Costas array base pattern. The dedicated pilot signals for the third and fourth MIMO streams are both formed over a group of 18 subcarriers and 6 symbols, e.g., formed over a sub-block.

In the embodiments herein illustrated, the derivation of one Costas array pattern from another Costas array base pattern has primarily taken the form of a simple time shift of one or two symbols in time. It will be appreciated that other and more complex shifts can also occur, e.g., shift by more than one or symbols in time or shifts of subcarrier according to the appropriate set of subcarriers and considerations herein discussed.

The foregoing has shown that pilot sequences for different streams and base stations can be generated by cyclically shifting the base pattern within the 18×6 subcarrier-symbol sub-block in the same manner as is done for common pilots (e.g., shifting over the entire block). Cyclic shifts in frequency are limited to multiples of 3 subcarriers. Therefore, possible shifts in frequency are in the set [0, 3, 6, . . . , 15] subcarriers. Cyclic shifts in time are performed over the last five symbols in the base pattern so that no pilot symbols for the third and fourth streams are transmitted in the first symbol. Therefore, cyclic shifts in time of up to five symbols are allowed. For the third and fourth streams from the same base station, only shifts in frequency and/or time of the base pattern that ensure that the pilot symbols for the two patterns do not overlap are used. Thus, for a shift of M integer number of subcarriers in frequency and N integer number of symbols in time, the symbol at index (i,j), i.e., at subcarrier index j and symbol index i ($1<=i<=5$, $0<=j<=35$) may be represented as (mod(i+N,5), mod(j+M,36)). For the dedicated pilot for streams 3 and 4, M belongs to the set [0, 3, . . . , 35].

In an example embodiment, the dedicated pilots belonging to the second set of subcarriers may be further restricted or partitioned into two orthogonal sub-sets, the first sub-set being for pilots to aid in channel estimation of a first set of data streams and the second sub-set for channel estimation of a different set of data streams.

Figure 10:
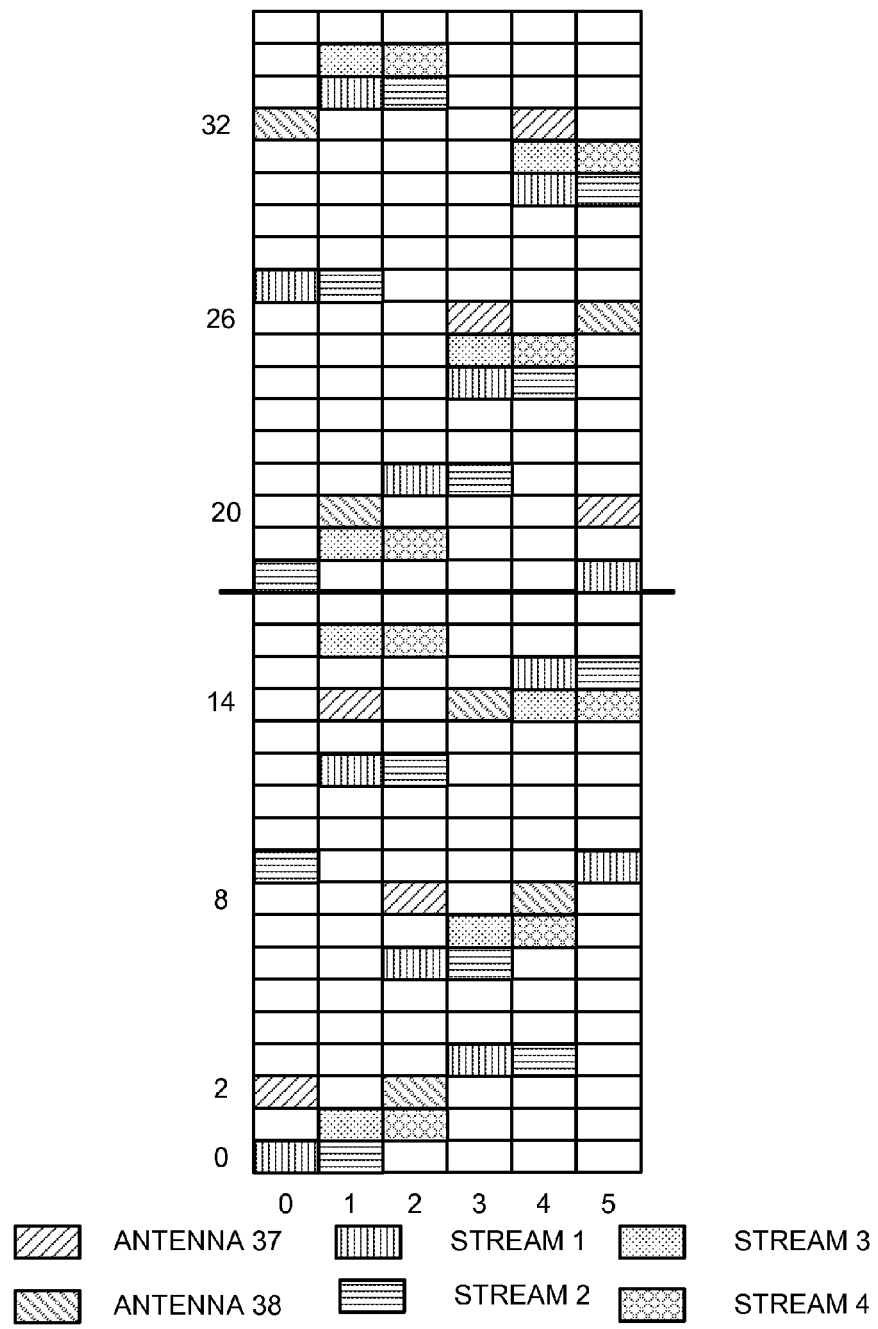
FIG. 10 is a diagrammatic view of a block of a frame showing distribution of symbols belonging to two common pilot sequences and four dedicated pilot sequences.

Both dedicated and common pilots may be transmitted in the same resource block without any overlap in pilot symbols transmitted from the same base station. In fact, FIG. 10 shows a block of a frame showing distribution of symbols belonging to two common pilot sequences and four dedicated pilot sequences. In particular, with respect to the base station node 28 of FIG. 1, FIG. 10 shows how the block carries the symbols for the common pilot signals of antenna 37 and antenna 38, as well as the four dedicated pilot signals. The common pilot signals of antenna 37 and antenna 38 shown in FIG. 10 are the same as those of FIG. 4. The dedicated pilot signals shown in FIG. 10 are those also shown in FIG. 7 for the first and second MIMO streams transmitted by base station node 28 and, in addition, those shown in FIG. 9 for the third and fourth MIMO streams transmitted by base station node 28.

The Costas array base pattern of FIG. 3 has six pilots per block, whereas the base pattern in FIG. 8 has four pilots per sub-block. Therefore, a base station could be transmitting a pilot pattern derived from the base pattern in FIG. 3 and a pilot pattern derived from the base pattern in FIG. 8 simultaneously, but in different sets of subcarriers and/or symbols. Accordingly, patterns derived from the base pattern of FIG. 3 could be transmitted in the subcarrier set {0, 3, 6, . . . } while the patterns derived from the base pattern in FIG. 8 could be transmitted in the subcarrier set {1, 4, 7, . . . }.

In a system such as that of the base station 28 of FIG. 1 which has four transit antennas (e.g., antennas 37, 38, 39, and 40) and a mobile station 30 that has four receive antennas (unillustrated antennas), up to four MIMO streams may be transmitted. Using four streams will give a greater peak data rate than two streams. The third and fourth MIMO streams use fewer pilots since the use of four streams most likely only occurs in high signal to noise ratio (SNR) low mobility situations. In such a scenario, acceptable channel estimation performance can be attained by using fewer pilots.

Figure 11:
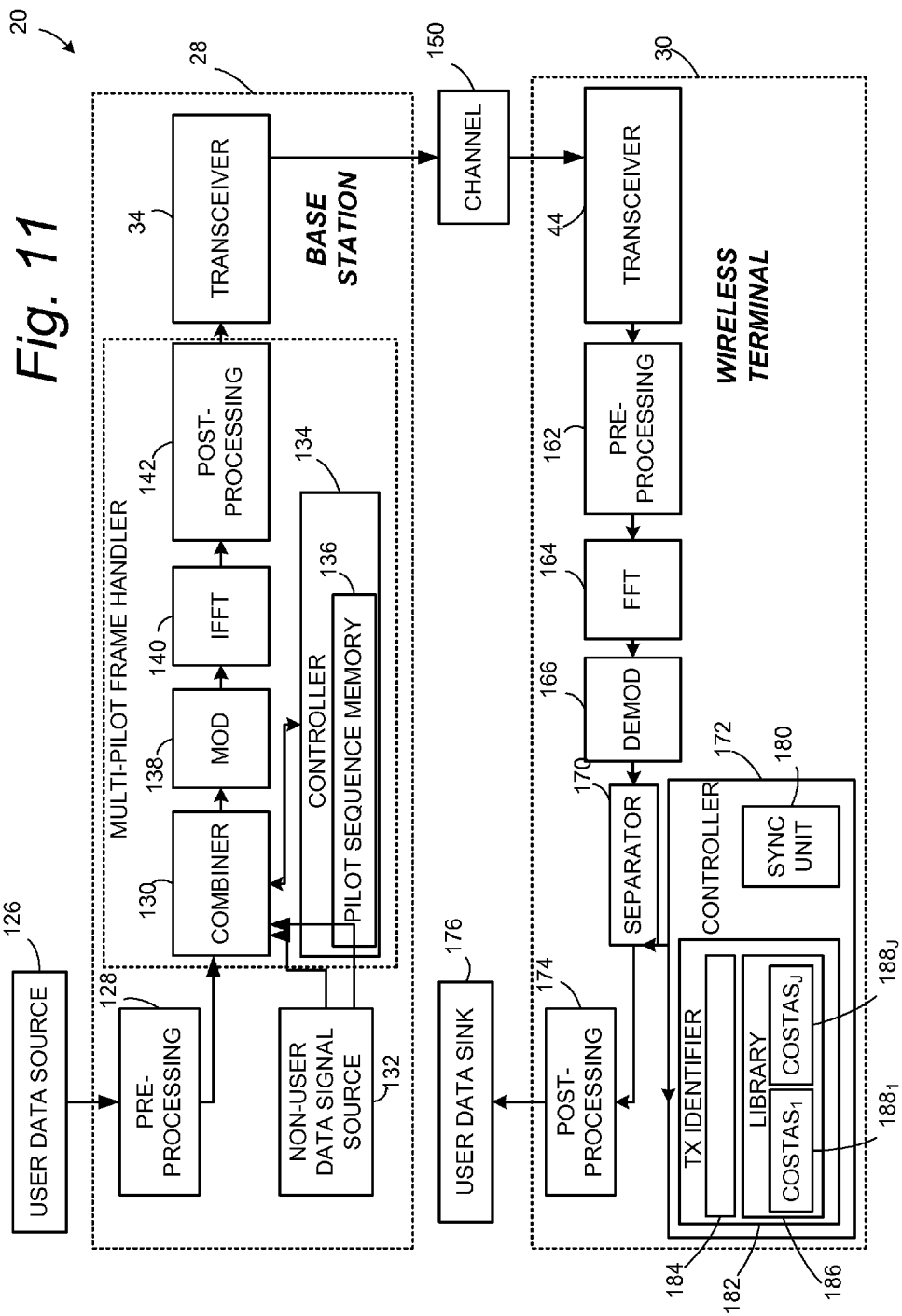
FIG. 11 is a schematic view showing aspects of a base station node and a wireless terminal in more detail for an example embodiment.

FIG. 11 shows aspects of the base station node 28 and wireless terminal (WT) 30 in more detail for an example embodiment. FIG. 11 illustrates that multi-pilot frame handler 36 of base station node 28 receives user data from a user data source 126. Optionally, and depending on the particular implementation, the base station node 28 comprises a pre-processing section 128 which can manipulate the user data obtained from user data source 126 by performing such optional functions as serial-to-parallel conversion and channel coding and interleaving.

The multi-pilot frame handler 36 comprises combiner 130 which combines the user data (optionally coded and/or interleaved) with non-user data signals such as control signals, synchronization signals, framing signals, and pilot signals. In FIG. 11, such control signals, synchronization signals, framing signals, and pilot signals are shown as being applied or received from a non-user data signal source 132. The combiner 130, which can be a multiplexer or function as a multiplexer, generates a bit stream by controlled introduction of the non-user data signals into the stream of user data. Control of introduction of the non-user data signals, including pilot signals, is achieved by controller 134. As illustrated in FIG. 11, controller 134 includes, e.g., a memory, register, or other suitable storage element 136 which contains a knowledge of the Costas array patterns utilized for the block, including the Costas array pattern(s) for the common pilot signal(s) of the base station node 28 and the Costas array pattern(s) for the dedicated pilot signal(s) of the base station node 28.

The bit stream output by combiner 130 is modulated by modulator 138 onto a series of subcarriers. As understood by those skilled in the art, the modulation performed by modulator 138 essentially maps groups of bits to a series of constellation points, represented as complex numbers. A parallel-to-serial conversion may be performed on the complex numbers output by modulator 138 prior to application to an Inverse Fast Fourier Transform (IFFT) unit 140. The Inverse Fast Fourier Transform (IFFT) unit 140 transforms the modulated carriers into a sequence of time domain samples.

The sequence of time domain samples output by Inverse Fast Fourier Transform (IFFT) unit 140 may undergo more processing functions by an optional post-processor 142. Such post-processing functions can include one or more of cyclic extension, windowing, peak control, all of which are understood by the person skilled in the art. The resultant OFDM waveform is applied to a transceiver 34, and particularly to a channel transmission element of transceiver 34. The channel transmission element, which can be an antenna or antenna system, for example, applies the OFDM waveform (I, Q output or digital IF signals) to channel 150. The channel 150 can be any suitable transmission um, such as a radio frequency, for example. The OFDM waveform is transmitted over channel 150, which has its own transmission function (as affected by properties of the channel and factors such as noise and interference, for example).

The example wireless terminal (WT) 30 shown in FIG. 1 comprises wireless terminal transceiver 44. For a wireless system, the wireless terminal transceiver 44 comprises a channel reception element which can be an antenna or antenna system. The OFDM waveform (I, Q input or digital IF signals) as received by wireless terminal transceiver 44 is applied to an optional pre-processing section 162. The pre-processing section 162 removes carrier offset caused by transmit and receiver local oscillator differences and selects an appropriate sequence of samples to apply to Fast Fourier Transform (FFT) unit 164. The output of the pre-processing section 162 may optionally be used to perform other functions such as estimation of the time or angle of arrival of the signal from the base station. The Fast Fourier Transform (FFT) unit 164 converts the time domain waveform to the frequency domain, after which an optional serial to parallel conversion may be performed. With the correct timing instant, the individual subcarriers are demodulated by demodulator 166. The output of demodulator 166 is applied to separator 170. The separator 170 sorts user data signals from non-user data signals, and may take the form of a demultiplexer or the like. Whatever form it takes, separator 170 is governed by a detector or controller 172. The detector 172 is configured to detect non-user data signals such as pilot signals, for example, and to control gating or routing of signals out of separator 170 in accordance with its determination.

User data signals gated out of separator 170 can be applied to an optional post-processing section 174. The post-processing section 174 can perform such functions as channel decoding, de-interleaving, and parallel-to-serial conversion, as appropriate. The user data thusly obtained is applied to a user data sink 176, which can be a voice, text, or other type of application, for example.

As previously indicated, the non-user data signals in the demodulated data stream are detected and used by controller 172. Among the non-user data signals are pilot signals. The demodulated pilot signals are particularly applied to both receiver synchronization unit 180 and transmitter identifier 182. The transmitter identifier 182 includes transmitter discrimination logic; a memory 184 or other element for storing the Costas array patterns which can be utilized by, e.g., base station node 28; and a library 186 of time-frequency shifts. The library 186 of time-frequency shifts can be embodied in a memory, register, or other storage device, and includes plural time-frequency shift patterns for potential association with corresponding plural OFDM transmitters. As shown in FIG. 11, the time-frequency shift patterns of library 186 include Costas array patterns $188_1$ through $188_j$.

The multi-pilot frame handler 36 of FIG. 11 knows which Costas array patterns to employ to generate the pilot signals (e.g., common pilot signal(s) and dedicated pilot signal(s)) for the time frequency plane array in view of its storage of the Costas array patterns in memory 136.

In another aspect of the technology, the wireless terminal (WT) 30 identifies a transmitter (e.g., base station) from which the receiver of the wireless terminal obtains orthogonal frequency division multiplexing (OFDM) signals by detecting the particular time-frequency shift of the time frequency plane array and associating the particular time-frequency shift with the originating transmitter. In this regard, upon detecting the time frequency plane array of its received signals, the controller 172 (which knows the Costas array patterns employed to generate the pilot signals) can determine how the time frequency plane array has been time-frequency shifted, and upon determining the pattern of the shift can associate the received signals with one of the transmitters for which the wireless terminal has stored Costas array patterns 188 in its library 186.

It should be understood that a wireless terminal such as wireless terminal 30 illustrated in FIG. 1 can be configured to receive frames and cooperate in accordance with one or more embodiments and implementations as described herein. In particular, as understood from the correlative operations performed by the frame handler 36 of the base station 28, wireless terminal frame handler 46 processes the block(s) of the frame obtained over the air interface 32. In an example embodiment, the wireless terminal frame handler 46 obtains from the received block a first pilot signal of a pilot signal first type and a first pilot signal of a pilot signal second type. The wireless terminal frame handler 46 is preconfigured or otherwise programmed to ascertain that the first pilot signal of the pilot signal first type is expressed as a base pattern of frequency-time resources of the block derived from a first Costas array and the first pilot signal of the second type being expressed as a base pattern of frequency-time resources of the block derived from a second Costas. The wireless terminal frame handler 46 is further arranged to process the block with the understanding or requirement that any pilot signal of the pilot signal first type is carried by at least some frequency-time resources of a first set of frequency-time resources of the block and any pilot signal of the pilot signal second type is carried by at least some frequency-time resources of a second set of frequency-time resources of the block (the second set being mutually exclusive relative to the first set). Furthermore, and as shown in FIG. 1, once the wireless terminal frame handler 46 obtains the pilot signal(s) from the block, the pilot signal utilization unit 48 utilizes the pilot signal of a pilot signal first type and the pilot signal of a pilot signal second type for at least one of base station identification, channel estimation, or synchronization.

The invention has the following non-exhaustive advantages: (1) a unified structure for common pilots and dedicated pilots using a single Costas array or multiple Costas arrays; (2) a design to generate a large number of unique dedicated pilot patterns in resource allocations of limited size by superposition of multiple mutually cyclically time and frequency shifted Costas arrays (3) an efficient design for channel estimation based on few pilots by using multiple Costas array patterns spread across multiple frequency groups; (4) an efficient method for differentiation of pilot signals from different base stations by varying the Costas array patterns used in time and/or frequency; and (5) using multiple Costas array base patterns of different sizes simultaneously on different sets of subcarriers or OFDM symbols, to serve the need for multiple types of pilots.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of operating a node of a radio access network, the method comprising:

the node providing a frame of information comprising at least one block, the block comprising frequency-time resources structured in a frequency-time plane array, the frequency-time plane array comprising plural frequency subcarriers and plural symbols;

selecting at the node a first set of frequency-time resources of the block for carrying any pilot signals which serve as a pilot signal of a pilot signal first type;

selecting at the node a second set of frequency-time resources of the block for carrying any pilot signals which serve as a pilot signal of a pilot signal second type; the second set being mutually exclusive relative to the first set;

using at the node a first base pattern of frequency-time resources of the block derived from a first Costas array for forming a first pilot signal of the pilot signal first type and allocating the frequency-time resources of the block whereby the first pilot signal of the pilot signal first type is carried by at least some frequency-time resources of the first set of frequency-time resources;

using at the node a second base pattern of frequency-time resources of the block derived from a second Costas array for forming a first pilot signal of the pilot signal second type and allocating the frequency-time resources of the block whereby the first pilot signal of the pilot signal second type is carried by at least some frequency-time resources of the second set of frequency-time resources, the second base pattern being different from the first base pattern and the second Costas array being different from the first Costas array;

wherein for a shift of an integer number M subcarriers in frequency and an integer number N symbols in time, shifting a symbol at index (i,j) in the first base pattern derived from the first Costas array to an index (mod(i+N, A), mod(j+M,B) to form a second pilot signal of the pilot signal first type, where A is an integer number of symbols in the block and B is an integer number of subcarriers in the block;

the node transmitting the frame including the block over a radio interface.

2. The method of claim 1, further comprising deriving at least one of the first and second base patterns of frequency-time resources of the block by superimposing a Costas array and a time-frequency shifted version thereof.

3. The method of claim 1, wherein the first set of frequency-time resources is a first set of subcarriers of the block and the second set of frequency-time resources is a second set of subcarriers of the block.

4. The method of claim 1, wherein the pilot signal first type is a common pilot signal and the pilot signal second type is a dedicated pilot signal.

5. The method of claim 1, further comprising forming a second pilot signal of the pilot signal first type in the block by cyclically shifting the base pattern of frequency-time resources in the block derived from the first Costas array and allocating the frequency-time resources of the block whereby the second pilot signal of the pilot signal first type is carried by at least some frequency-time resources of the first set of frequency-time resources.

6. The method of claim 1, wherein M belongs to a subset of all possible shifts.

7. The method of claim 1, further comprising forming a second pilot signal of the pilot signal second type in the block by cyclically shifting the base pattern of frequency-time resources in the block derived from the second Costas array and allocating the frequency-time resources of the block whereby the second pilot signal of the pilot signal second type is carried by at least some of the frequency-time resources of the second set of frequency-time resources.

8. The method of claim 7, further comprising:

forming a sub-block of frequency-time resources from the block;

using a third base pattern of resource elements of the sub-block derived from a Costas array for forming a third pilot signal of the pilot signal second type and allocating the frequency-time resources of the block whereby the third pilot signal of the pilot signal second type is carried by at least some frequency-time resources of the second set of frequency-time resources.

9. The method of claim 8, further comprising forming a fourth pilot signal of the pilot signal second type in the block by cyclically shifting the base pattern of frequency-time resources in the sub-block derived from the second Costas array and allocating the frequency-time resources of the sub-block whereby the fourth pilot signal of the pilot signal second type is carried by at least some of the frequency-time resources of the second set of frequency-time resources.

10. The method of claim 1, wherein the first base pattern and the second base pattern being positioned relative to one another within the block so that the frequency-time resources of the first pilot signal and the frequency-time resources of the second pilot signal are interspersed relative to one another within the block.

11. A method of operating a node of a radio access network comprising including in the frame plural blocks structured in the manner of claim 1, wherein at least a first group of the plural blocks have at least one pilot signal thereof expressed by a first time-frequency shift and at least a second group of the plural blocks have at least one pilot signal thereof expressed by a second time-frequency shift which is different from the first time-frequency shift.

12. The method of claim 11, wherein the first group of the plural blocks and the second group of plural blocks are located in the frame according to a pattern.

13. A radio access network node comprising:
a transceiver configured to communicate a frame of information over an air interface with a wireless terminal, the frame of information comprising at least one block, the block comprising frequency-time resources structured in a frequency-time plane array, the frequency-time plane array comprising plural frequency subcarriers and plural symbols, and
a frame handler arranged to prepare a block of the frame of information to include a first pilot signal of a pilot signal first type and a first pilot signal of a pilot signal second type, the first pilot signal of the pilot signal first type being expressed as a first base pattern of frequency-time resources of the block derived from a first Costas array and the first pilot signal of the second type being expressed as a second base pattern of frequency-time resources of the block derived from a second Costas array, the second base pattern being different from the first base pattern and the second Costas array being different from the first Costas array;
the frame handler being further arranged to prepare the block whereby any pilot signal of the pilot signal first type is carried by at least some frequency-time resources of a first set of frequency-time resources of the block and any pilot signal of the pilot signal second type is carried by at least some frequency-time resources of a second set of frequency-time resources of the block; the second set being mutually exclusive relative to the first set
wherein for a shift of an integer number M subcarriers in frequency and an integer number N symbols in time, the frame handler is arranged to shift a symbol at index (i,j) in the first base pattern derived from the first Costas array to an index (mod(i+N, A), mod(j+M,B) to form a second pilot signal of the pilot signal first type, where A is an integer number of symbols in the block and B is an integer number of subcarriers in the block.

14. The node of claim 13, wherein at least one of the first and second base patterns of frequency-time resources of the block are derived by superimposing a Costas array and a time-frequency shifted version thereof.

15. The node of claim 13, wherein the first set of frequency-time resources is a first set of subcarriers of the block and the second set of frequency-time resources is a second set of subcarriers of the block.

16. The node of claim 13, wherein the pilot signal first type is a common pilot signal and the pilot signal first type is a dedicated pilot signal.

17. The node of claim 13, wherein the frame handler is arranged to form a second pilot signal of the pilot signal first type in the block by cyclically shifting the first base pattern of frequency-time resources in the block derived from the first Costas array and allocating the frequency-time resources of the block whereby the second pilot signal of the pilot signal first type is carried by at least some of the frequency-time resources of the first set of frequency-time resources.

18. The node of claim 13, and M belongs to a set of all possible shifts.

19. The node of claim 13, wherein the frame handler is arranged to form a second pilot signal of the pilot signal second type in the block by cyclically shifting the base pattern of frequency-time resources in the block derived from the second Costas array and allocating the frequency-time resources of the block whereby the second pilot signal of the pilot signal second type is carried by at least some of the frequency-time resources of the second set of frequency-time resources.

20. The node of claim 19, wherein the frame handler is arranged to form a sub-block of frequency-time resources from the block, to use a base pattern of frequency-time resources of the sub-block derived from a third Costas array for forming a third pilot signal of the pilot signal second type, and to allocate the frequency-time resources of the block whereby the third pilot signal of the pilot signal second type is carried by at least some frequency-time resources of the second set of frequency-time resources.

21. The node of claim 20, wherein the frame handler is arranged to form a fourth pilot signal of the pilot signal second type in the block by cyclically shifting the array base pattern of frequency-time resources in the sub-block derived from the second Costas array and to allocate the frequency-time resources of the sub-block whereby the fourth pilot signal of the pilot signal second type is carried by at least some of the frequency-time resources of the second set of frequency-time resources.

22. The node of claim 13, wherein the frame handler is configured to prepare the frame to comprise plural blocks, wherein at least a first group of the plural blocks have at least one pilot signal thereof expressed by a first time-frequency shift and at least a second group of the plural blocks have at least one pilot signal thereof expressed by a second time-frequency shift which is different from the first time-frequency shift.

23. The node of claim 22, wherein the first group of the plural blocks and the second group of plural blocks are located in the frame according to a pattern.

24. The node of claim 13, wherein the frame handler further comprises:
a modulator for using a data stream to generate plural modulated carriers;
an Inverse Fast Fourier Transform (IFFT) unit for transforming modulated carriers into a sequence of time domain samples;
means for applying the sequence of time domain samples to a channel;
means for combining user data and the pilot signals for generating the data stream applied to the modulator.

25. The node of claim 13, wherein the first base pattern and the second base pattern being positioned relative to one another within the block so that the frequency-time resources of the first pilot signal and the frequency-time resources of the second pilot signal are interspersed relative to one another within the block.

26. A method of operating a node of a radio access network, the method comprising:
providing a frame of information comprising at least one block, the block comprising frequency-time resources structured in a frequency-time plane array, the frequency-time plane array comprising plural frequency subcarriers and plural symbols;
including in the block multiple patterns of different sizes derived from respective multiple Costas arrays and which use different sets of frequency-time resources to serve for respective multiple types of pilot signals;
wherein for a shift of an integer number M subcarriers in frequency and an integer number N symbols in time, shifting a symbol at index (i,j) in a first pattern derived from a first Costas array forming a first pilot signal of a pilot signal first type to an index (mod(i+N, A), mod(j+M,B) to form a second pilot signal of a pilot signal first type, where A is an integer number of symbols in the block and B is an integer number of subcarriers in the block;

transmitting the frame including the block over a radio interface.

27. The method of claim 26, wherein the multiple types of pilot signals include a common pilot signal and a dedicated pilot signal, and wherein the common pilot signal has one or more occurrence in the block and wherein the dedicated pilot signal has multiple occurrences in the block.

28. The method of claim 26, wherein the multiple Costas arrays being positioned relative to one another within the block so that the frequency-time resources of the multiple Costas arrays used for pilot signals are interspersed relative to one another within the block.

29. A node of a radio access network comprising:
a transceiver configured to communicate a frame of information over an air interface with a wireless terminal, the frame of information comprising at least one block, the block comprising frequency-time resources structured in a frequency-time plane array, the frequency-time plane array comprising plural frequency subcarriers and plural symbols, and
a frame handler arranged to include in the block multiple patterns of different sizes derived from respective multiple Costas arrays and which use different sets of frequency-time resources to serve for respective multiple types of pilot signals;
wherein for a shift of an integer number M subcarriers in frequency and an integer number N symbols in time, the frame handler is configured to shift a symbol at index (i,j) in a first pattern derived from a first Costas array forming a first pilot signal of a pilot signal first type to an index (mod(i+N, A), mod(j+M,B) to form a second pilot signal of a pilot signal first type, where A is an integer number of symbols in the block and B is an integer number of subcarriers in the block.

30. The node of claim 29, the multiple Costas arrays being positioned relative to one another within the block so that the frequency-time resources of the multiple Costas arrays used for pilot signals are interspersed relative to one another within the block.

31. A wireless terminal comprising:
a transceiver configured to communicate a frame of information over an air interface with a radio access network, the frame of information comprising at least one block, the block comprising frequency-time resources structured in a frequency-time plane array, the frequency-time plane array comprising plural frequency subcarriers and plural symbols, and
a frame handler arranged to process the block and to obtain therefrom a first pilot signal of a pilot signal first type and a first pilot signal of a pilot signal second type, the first pilot signal of the pilot signal first type being expressed as a first base pattern of frequency-time resources of the block derived from a first Costas array and the first pilot signal of the second type being expressed as a base pattern of frequency-time resources of the block derived from a second Costas array, the second base pattern being different from the first base pattern and the second Costas array being different from the first Costas array, the frame handler being further arranged to process the block whereby any pilot signal of the pilot signal first type is carried by at least some frequency-time resources of a first set of frequency-time resources of the block and any pilot signal of the pilot signal second type is carried by at least some frequency-time resources of a second set of frequency-time resources of the block, the second set being mutually exclusive relative to the first set;
wherein for a shift of an integer number M subcarriers in frequency and an integer number N symbols in time, the frame handler is configured to process a symbol at index (i,j) in a first pattern derived from the first Costas array as a first pilot signal of a pilot signal first type and to process a symbol at an index (mod(i+N, A), mod(j+M, B) as a second pilot signal of a pilot signal first type, where A is an integer number of symbols in the block and B is an integer number of subcarriers in the block;
a pilot utilization unit configured to utilize the pilot signal of a pilot signal first type and the pilot signal of a pilot signal second type for at least one of base station identification, channel estimation, or synchronization.

32. The wireless terminal of claim 31, the first base pattern and the second base pattern being positioned relative to one another within the block so that the frequency-time resources of the first pilot signal and the frequency-time resources of the second pilot signal are interspersed relative to one another within the block.

33. A method of operating a node of a radio access network, the method comprising:
providing a frame of information comprising at least one block, the block comprising frequency-time resources structured in a frequency-time plane array, the frequency-time plane array comprising plural frequency subcarriers and plural symbols;
selecting at the node a first set of frequency-time resources of the block;
selecting at the node a second set of frequency-time resources of the block; the second set being mutually exclusive relative to the first set;
allocating the frequency-time resources of the block so that a first common pilot signal is carried in the frequency-time resources of the block that belong to a first Costas array and to the frequency subcarriers of the first set of frequency-time resources; and
allocating the frequency-time resources of the block so that a first dedicated pilot signal is carried in the frequency-time resources of the block that belong (1) to either a first Costas array or a second Costas array and (2) to the frequency subcarriers of the second set of frequency-time resources;
wherein for a shift of an integer number M subcarriers in frequency and an integer number N symbols in time, the frame handler is arranged to shift a symbol at index (i,j) in the first base pattern derived from the first Costas array to an index (mod(i+N, A), mod(j+M,B) to form a second pilot signal of the pilot signal first type, where A is an integer number of symbols in the block and B is an integer number of subcarriers in the block.

34. The method of claim 33, wherein the first Costas array is formed by performing a frequency and/or time shift of a Costas base pattern so that the frequency-time resources that belong to the first Costas array also belong to the first set of frequency-time resources.

35. The method of claim 33, further comprising distributing the first Costas array over the block by spacing rows of the first Costas array over frequency subcarriers of the block.

36. The method of claim 33, wherein the first Costas array and the second Costas array being positioned relative to one another within the block so that the frequency-time resources of the first Costas array and the second Costas array used for pilot signals are interspersed relative to one another within the block.

37. A radio access network node comprising:
- a transceiver configured to communicate a frame of information over an air interface with a wireless terminal, the frame of information comprising at least one block, the block comprising frequency-time resources structured in a frequency-time plane array, the frequency-time plane array comprising plural frequency subcarriers and plural symbols, and
- a frame handler arranged to allocate the frequency-time resources of the block so that a first common pilot signal is carried in the frequency-time resources of the block that belong to a first Costas array and to the frequency subcarriers of the first set of frequency-time resources;
- the frame handler further being arranged to allocate the frequency-time resources of the block so that a first dedicated pilot signal is carried in the frequency-time resources of the block that belong (1) to either a first Costas array or a second Costas array and (2) to the frequency subcarriers of the second set of frequency-time resources, the second set being mutually exclusive relative to the first set;
- wherein for a shift of an integer number M subcarriers in frequency and an integer number N symbols in time, the frame handler is configured to shift a symbol at index (i,j) in a first pattern derived from the first Costas array forming a first pilot signal of a pilot signal first type to an index (mod(i+N, A), mod(j+M,B) to form a second pilot signal of a pilot signal first type, where A is an integer number of symbols in the block and B is an integer number of subcarriers in the block.

38. The node of claim 37, wherein the first Costas array is formed by performing a frequency and/or time shift of a Costas base pattern so that the frequency-time resources that belong to the first Costas array also belong to the first set of frequency-time resources.

39. The node of claim 37, further comprising distributing the first Costas array over the block by spacing rows of the first Costas array over frequency subcarriers of the block.

40. The node of claim 37, wherein the first Costas array and the second Costas array being positioned relative to one another within the block so that the frequency-time resources of the first Costas array and the second Costas array used for pilot signals are interspersed relative to one another within the block.

* * * * *

UNITED STATES PATENT AND TRADEMARK OFFICE
CERTIFICATE OF CORRECTION

Page 1 of 1

PATENT NO.       : 8,811,331 B2
APPLICATION NO.  : 12/420404
DATED            : August 19, 2014
INVENTOR(S)      : Koorapaty et al.

It is certified that error appears in the above-identified patent and that said Letters Patent is hereby corrected as shown below:

In Column 12, Line 62, delete "$B_{ij}$" and insert -- $B_{i,j}$ --, therefor.

Signed and Sealed this
Twelfth Day of January, 2016

Michelle K. Lee
*Director of the United States Patent and Trademark Office*